(12) United States Patent
Ito

(10) Patent No.: US 6,992,274 B2
(45) Date of Patent: Jan. 31, 2006

(54) LASER PROCESSING METHOD AND APPARATUS

(75) Inventor: Hiroshi Ito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/934,508

(22) Filed: Sep. 7, 2004

(65) Prior Publication Data

US 2005/0032385 A1 Feb. 10, 2005

Related U.S. Application Data

(62) Division of application No. 10/067,309, filed on Feb. 7, 2002, now Pat. No. 6,809,013.

(30) Foreign Application Priority Data

Feb. 8, 2001 (JP) ............................. 2001-032708

(51) Int. Cl.
*G01J 1/32* (2006.01)
(52) U.S. Cl. .................................... 250/205; 250/559.3
(58) Field of Classification Search ..................... None
See application file for complete search history.

(56) References Cited

U.S. PATENT DOCUMENTS

| | | | | |
|---|---|---|---|---|
| 5,491,534 | A | * | 2/1996 | Shiozawa ..................... 355/69 |
| 2001/0001745 | A1 | | 5/2001 | Im et al. |
| 2001/0045974 | A1 | | 11/2001 | Shoemaker et al. |
| 2002/0192572 | A1 | | 12/2002 | Lau |
| 2003/0000930 | A1 | | 1/2003 | Hamada |

FOREIGN PATENT DOCUMENTS

| | | |
|---|---|---|
| JP | 56-137546 | 10/1981 |
| JP | 58-39012 | 3/1983 |
| JP | 3-204986 | 9/2001 |

* cited by examiner

*Primary Examiner*—Que T. Le
(74) *Attorney, Agent, or Firm*—Oblon, Spivak, McClelland, Maier & Neustadt, P.C.

(57) ABSTRACT

There is disclosed a laser processing method including moving a mask and a work with respect to each other while emitting a pulse laser a plurality of times, and moving the mask and the work with respect to each other to form respective laser irradiated regions disposed adjacent to one another by irradiating the work with the pulse laser transmitted through openings formed in positions different from one another on the mask, so that boundaries of the laser irradiated regions disposed adjacent to each other contact at least each other.

10 Claims, 20 Drawing Sheets

Region crystallized after first shot

Region crystallized after second shot

Region crystallized after third shot

Region crystallized after fourth shot

Region crystallized after fifth shot

Region crystallized after second shot

Region crystallized after third shot

Region crystallized after fourth shot

Region crystallized after fifth shot

Region crystallized after first shot

Region crystallized after second shot

Region crystallized after third shot

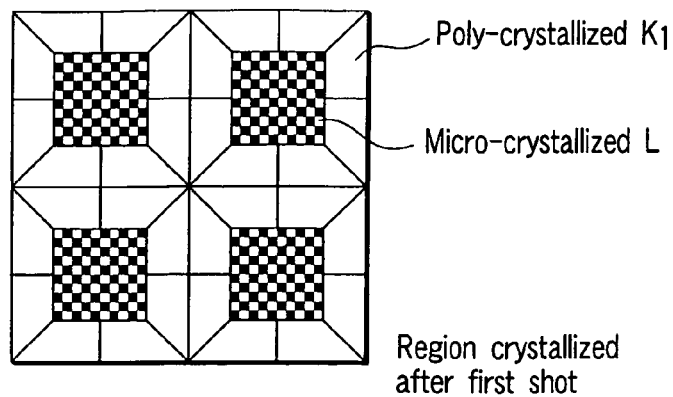
FIG. 23 Region crystallized after first shot
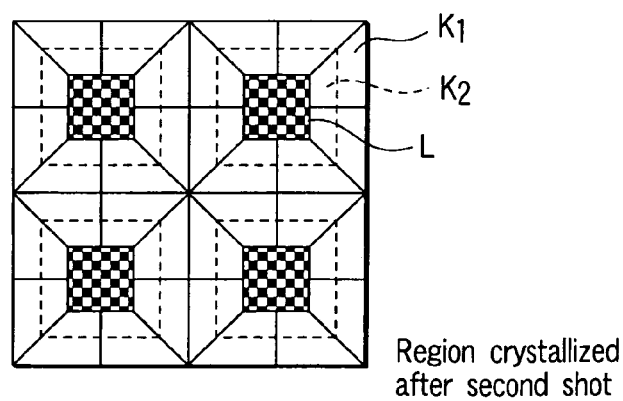
FIG. 24 Region crystallized after second shot
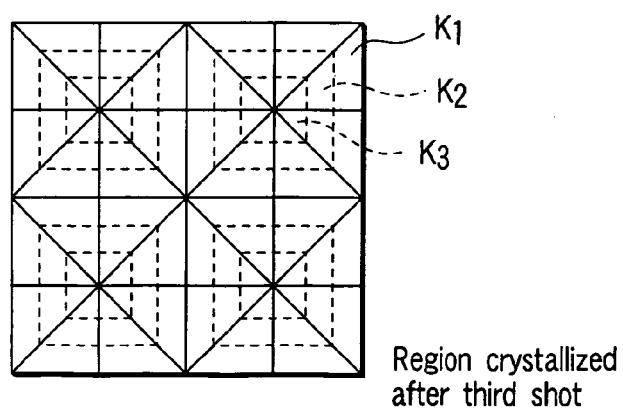
FIG. 25 Region crystallized after third shot

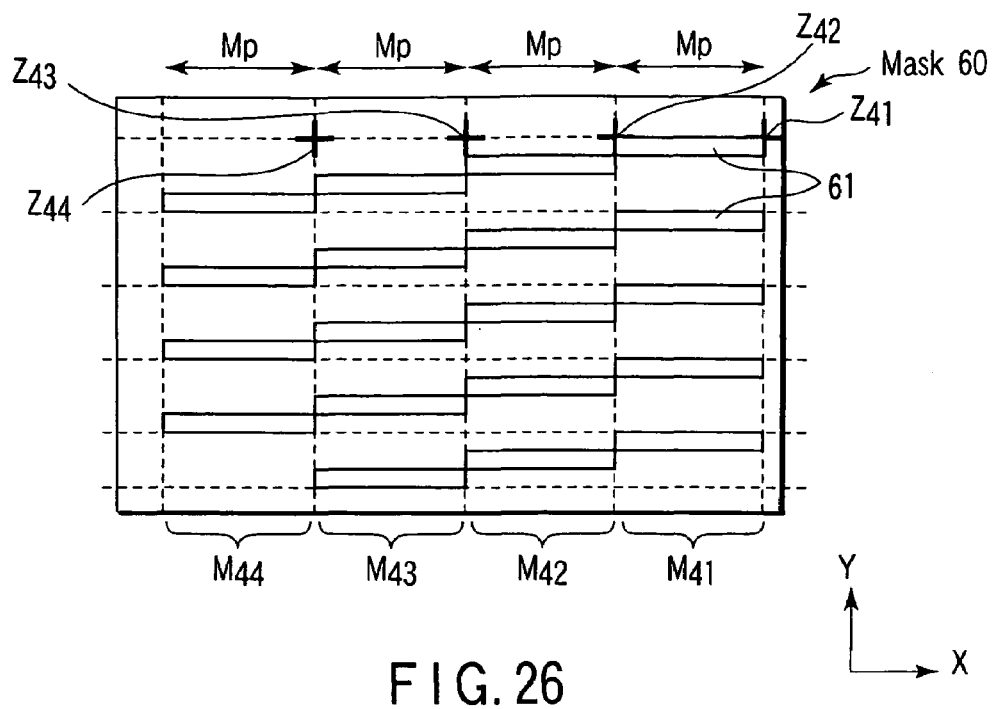
FIG. 26
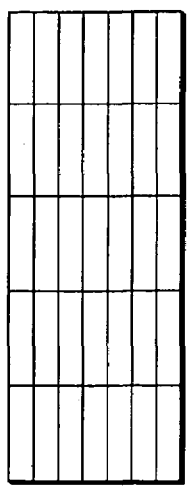
Growth direction of crystal particle
FIG. 27

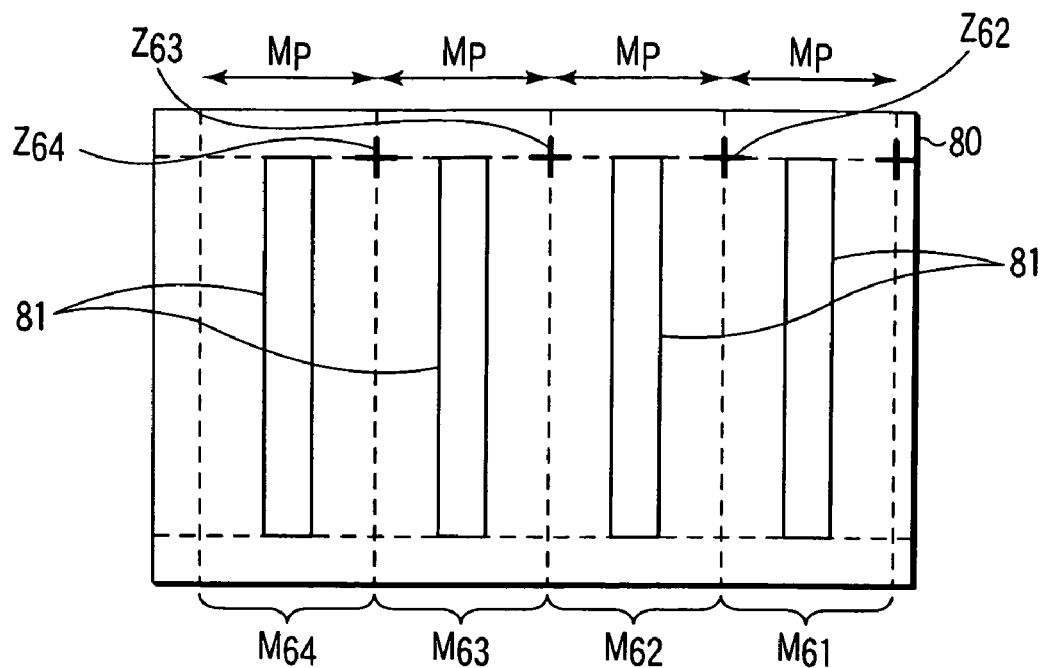
F I G. 30
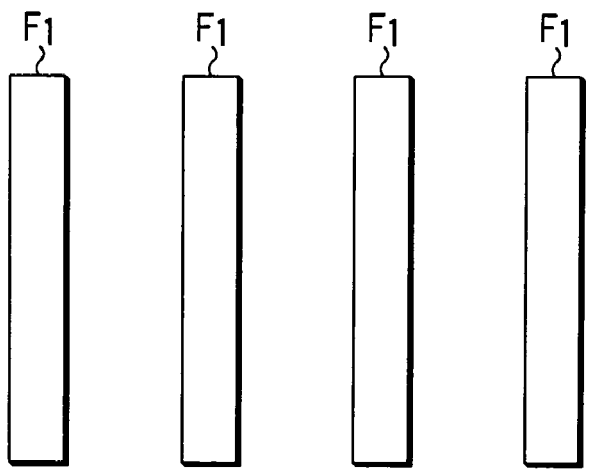
F I G. 31

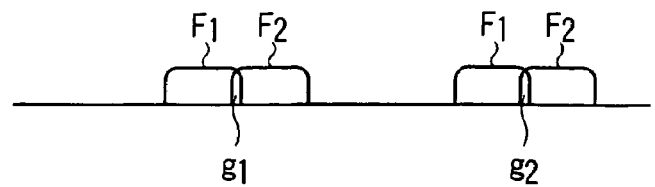
F I G. 34
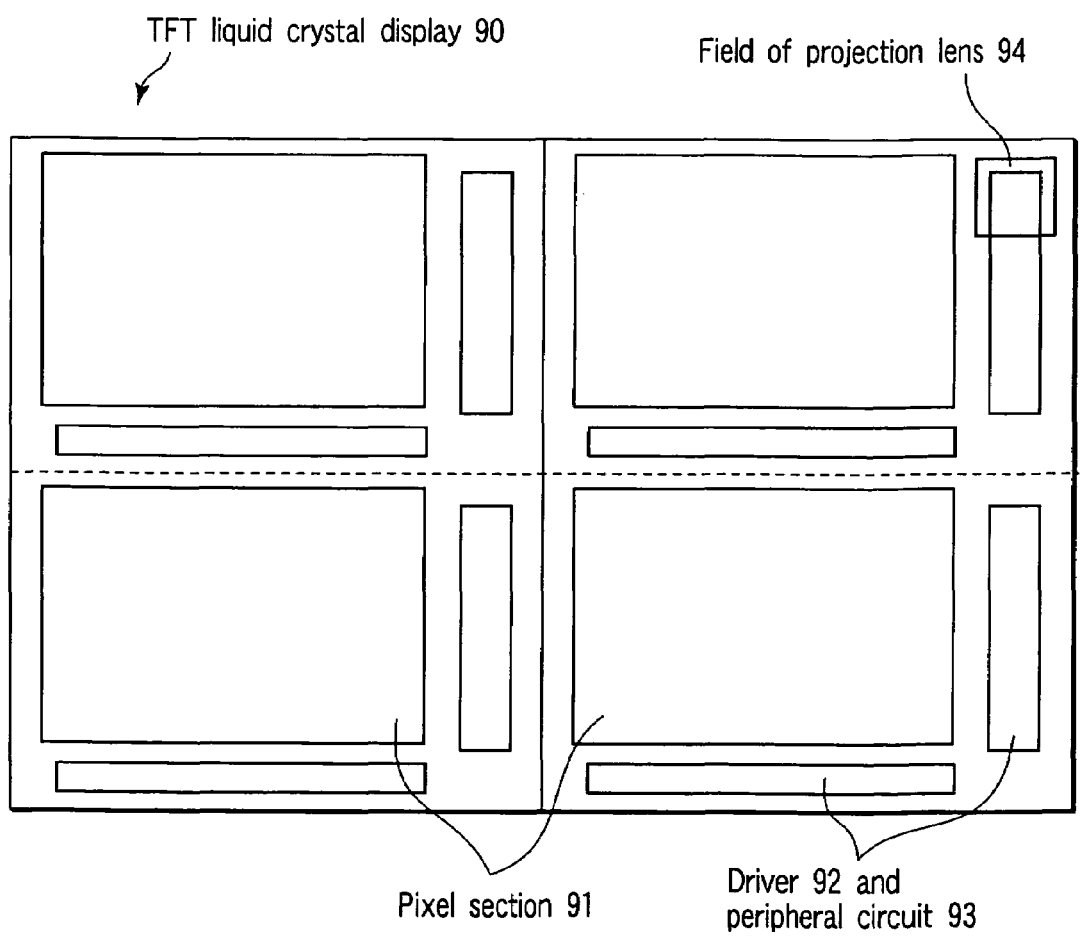
F I G. 35

LASER PROCESSING METHOD AND APPARATUS

CROSS-REFERENCE TO RELATED APPLICATIONS

This application is a divisional of application Ser. No. 10/067,309, filed Feb. 7, 2002, now U.S. Pat. No. 6,809,013, which is based upon and claims the benefit of priority from the prior Japanese Patent Application No. 2001-032708, filed Feb. 8, 2001, the entire contents of both of these applications are incorporated herein by reference.

BACKGROUND OF THE INVENTION

1. Field of the Invention

The present invention relates to a manufacturing process, for example, of a polysilicon (p-Si) thin film transistor (TFT) liquid crystal display, and to a laser processing method and apparatus in which a workpiece such as an amorphous silicon (a-Si) film is irradiated with a pulse laser beam, and the a-Si film is poly-crystallized.

2. Description of the Related Art

A manufacturing process of a p-Si TFT liquid crystal display includes a process of poly-crystallization. The process includes: forming an a-Si thin film on a glass substrate of the liquid crystal display; and forming the thin film into a polycrystalline silicon (Si) film.

Examples of a method of poly-crystallization include a solid phase growth method and an excimer laser annealing method. The solid phase growth method includes annealing the a-Si film formed on the glass substrate at a high temperature so that a polycrystalline Si film is obtained. Since the solid phase growth method is a high-temperature process, it is necessary to use an expensive quartz glass in the glass substrate.

The excimer laser annealing method includes irradiating the a-Si film with a short-pulse excimer laser having a pulse width of about 20 ns so that the polycrystalline Si film is obtained. Since the excimer laser annealing method is a low-temperature process, mass production can be realized.

In the p-Si TFT liquid crystal display, an enhanced capability has been requested to be realized. To realize the enhanced capability, there has been a stronger demand for further enlargement of a current crystal particle diameter of the polycrystalline Si film. Concretely, the crystal particle diameter is around 0.5 $\mu$m in the current method, and there has been a strong demand for setting of the diameter to several micrometers or more.

Reasons for this will be described. There is a numeric value of mobility as a factor which influences the capability of a semiconductor device. The mobility represents a movement speed of an electron. The movement speed drops, when the crystal particle diameter is small and there are many crystal particle fields in a path of the electron. When the movement speed decreases, the enhanced capability of the semiconductor device cannot be expected. Therefore, there is a demand for enlargement of the crystal particle diameter of the polycrystalline Si film.

Examples of an enlargement method of the crystal particle diameter include techniques described, for example, in Jpn. Pat. Appln. KOKAI Publication No. 56-137546 and PCT National Publication No. 2000-505241. The Jpn. Pat. Appln. KOKAI Publication No. 56-137546 discloses a method for using a roof-shaped laser beam to scan a work. The PCT National Publication No. 2000-505241 discloses a method called super lateral growth.

These methods include: successively irradiating an Si thin film with a laser beam having a linear or roof-shaped pattern in synchronization with movement of the Si thin film, that is, the glass substrate. The present inventors have verified that the crystal particle diameter of the polycrystalline Si film is enlarged by these methods.

However, in these methods, since the Si thin film is successively irradiated with the laser beam at an interval, the glass substrate has to be moved for each irradiation with the laser beam. A movement distance needs to be between about 0.1 $\mu$m and 1.0 $\mu$m.

Therefore, in order to form the Si thin film into the polycrystalline Si film on a large-sized glass substrate, for example, a 300 mm×400 mm glass substrate, the glass substrate has to be moved at an interval of about 0.1 $\mu$m to 1.0 $\mu$m. To form the polycrystalline Si film over the large-sized glass substrate, a throughput of several hours is required, and formation cannot be realized.

Examples of a method for forming the polycrystalline Si film at a higher speed include a method described in Jpn. Pat. Appln. No. 9-217213. This method includes: forming a plurality of repeated patterns 1 on a mask as shown in FIG. 1; and moving the glass substrate by a pitch of the pattern 1.

Subsequently, the glass substrate is irradiated with the laser beam through the mask. In a region irradiated with the laser beam, a crystal grows, and the whole region irradiated with the laser beam is poly-crystallized. FIG. 1 shows a crystal grown region 2.

Subsequently, the glass substrate is moved in a stepwise manner by the region irradiated with the laser beam.

Subsequently, the glass substrate is irradiated with the laser beam through the mask. In the region irradiated with the laser beam, the crystal grows, and the whole region irradiated with the laser beam is poly-crystallized.

Thereafter, the irradiation with the laser beam and the stepwise movement of the glass substrate are repeated, and the whole glass substrate is poly-crystallized.

There is another method for forming the polycrystalline Si film at a high speed. In the method, the pitch of the pattern 1 formed on the mask is reduced as shown in FIG. 2, and the glass substrate is not moved. This mask is used to grow the crystal in a region portion irradiated with the laser beam.

The method includes: using the mask with the repeated pattern, for example, having a pattern width of 2 $\mu$m and pitch of $\mu$m formed thereon to form, for example, a polycrystal having a length of 2 $\mu$m and width of 0.3 $\mu$m.

However, the former method requires a throughput of several hours, is unrealistic, and has a low productivity. In this method, when a width of the laser beam is set, for example, to 5 $\mu$m or more as shown in FIG. 3, a heat gradient of a middle portion in the region irradiated with the laser beam is reduced.

Therefore, boundaries of opposite ends of the region irradiated with the laser beam have a large particle diameter, but the middle portion is micro-crystallized. Then, a transistor is formed on the crystallized region, but the micro-crystallization forms an Si crystal film which inhibits enhancement of the capability of the transistor.

In the latter method, there are large influences of a stop operation in a substrate conveyance system for moving the glass substrate in the stepwise manner, deceleration operation during restart, and an acceleration time. Therefore, the throughput in an actual mass production line is not achieved, and a further high-speed processing is necessary.

In the latter method for narrowing the pitch of the pattern 1, because of a heat influence from the adjacent pattern 1, a growth speed of a lateral direction (vertical to a film thickness direction) of the Si film is lowered. Therefore, in the latter method, a part of the region irradiated with the laser beam, for example, the middle portion of the irradiated region is micro-crystallized, and a micro crystal region 3 is formed as shown in FIG. 2.

Furthermore, when the pitch of the repeated pattern 1 is narrowed, the whole surface of the region irradiated with the laser beam is micro-crystallized, and the mobility of the electron is lowered as shown in FIG. 4.

BRIEF SUMMARY OF THE INVENTION

An object of the present invention is to provide a laser processing method and apparatus in which a polycrystalline Si film having a uniform and large particle diameter can be formed with a high throughput.

According to a major aspect of the present invention, there is provided a laser processing method for irradiating a mask with a plurality of openings formed therein with a pulse laser, and irradiating a plurality of portions of a work to be processed with the pulse laser transmitted through the plurality of openings at the same time. The method comprises: moving a mask and a work with respect to each other while emitting the pulse laser a plurality of times; and setting a relation between a relative movement speed of the mask and the work and an emission timing of the pulse laser such that respective laser irradiated regions disposed adjacent to one another on the work are formed by irradiation with the pulse laser transmitted through the openings formed in positions different from one another on the mask, and boundaries of the respective laser irradiated regions disposed adjacent to each other contact at least each other.

According to another major aspect of the present invention, there is provided a laser processing apparatus for irradiating a mask with a plurality of openings formed therein with a pulse laser, and irradiating a plurality of portions of a work to be processed with the pulse laser transmitted through the plurality of openings at the same time. The apparatus comprises: a laser device for outputting the pulse laser; a moving section which moves the mask and the work with respect to each another; and a controller which controls the moving section to move the mask and the work with respect to each other, and controls the laser device to emit the pulse laser a plurality of times. The controller controls the moving section to move the mask and the work with respect to each other so that respective laser irradiated regions disposed adjacent to one another are irradiated with the pulse laser transmitted through the openings different from one another among the plurality of openings, and boundaries of the respective laser irradiated regions disposed adjacent to each other contact at least each other.

BRIEF DESCRIPTION OF THE SEVERAL VIEWS OF THE DRAWING

FIG. 23 is a diagram showing the region crystallized by the first shot of pulse laser beam;

FIG. 24 is a diagram showing the region crystallized by the second shot of pulse laser beam;

FIG. 25 is a diagram showing the region crystallized by the third shot of pulse laser beam;

FIG. 26 is a constitution diagram of the mask in the laser processing apparatus according to a fifth embodiment of the present invention;

FIG. 27 is a diagram showing a growth direction of a polycrystal when the mask in the fifth embodiment is used;

FIG. 30 is a constitution diagram of the mask in the laser processing apparatus according to a seventh embodiment of the present invention;

FIG. 31 is a diagram showing the region crystallized by the first shot of pulse laser beam;

FIG. 34 is a diagram showing an overlap of the regions irradiated with the respective shots of laser;

FIG. 35 is an explanatory view of a manufacturing method of a TFT liquid crystal display to which the laser processing apparatus of the seventh embodiment of the present invention is applied;

DETAILED DESCRIPTION OF THE INVENTION

A first embodiment of the present invention will be described hereinafter with reference to the drawings.

Figure 5:
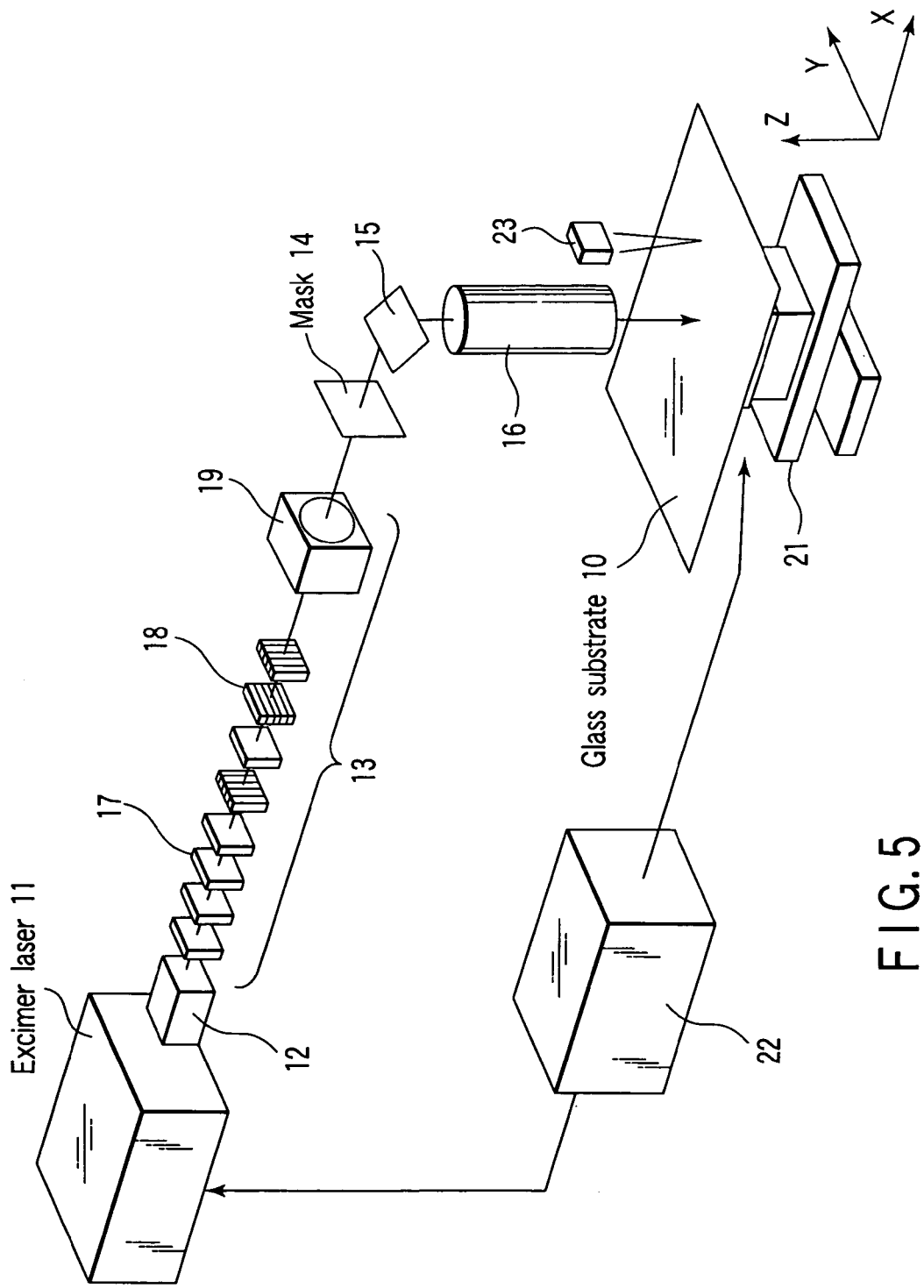
FIG. 5 is a constitution diagram showing a laser processing apparatus according to a first embodiment of the present invention.

FIG. 5 is a constitution diagram of a laser processing apparatus. The laser processing apparatus is applied to manufacturing of a p-Si TFT liquid crystal display which has a process of poly-crystallization of an a-Si film formed on a glass substrate 10.

An excimer laser 11 outputs a pulse laser, for example, at a repeated frequency of 200 to 500 Hz. The excimer laser 11 outputs the pulse laser whose energy density of an irradiated point on the a-Si film is of the order of 200 to 500 J/cm$^2$. The point irradiated with the pulse laser forms a processed point on the a-Si film.

A variable attenuator 12, lighting optical system 13, mask 14, and mirror 15 are disposed along an optical path of the pulse laser. A projection lens 16 is disposed on a reflected light path of the mirror 15.

The lighting optical system 13 is constituted of a homogenizer, and a beam shaping optical system of the pulse laser beam. Concretely, the lighting optical system 13 includes a collimator lens 17, array lens group 18, and field lens 19.

The homogenizer forms the pulse laser beam as a beam having a uniform strength on the mask 14. The homogenizer is formed by a combination of the field lens 19 and array lens group 18.

The projection lens 16 transfers a mask pattern formed on the mask 14 onto the a-Si film.

Eight line patterns 20 as openings are formed in the same direction in the mask 14. A width and pitch of the line pattern 20 is formed in sizes to form a polycrystalline Si film having a predetermined or larger crystal particle diameter, when the a-Si film is irradiated with the pulse laser and poly-crystallized.

The width of each line pattern 20 is formed in such a line width length that a heat gradient is generated in the laser irradiated region obtained by irradiating the a-Si film with the pulse laser. The pitch between the line patterns 20 is formed in a pitch interval such that the heat gradient is generated in the laser irradiated region obtained, when irradiating the a-Si film with the pulse laser.

A constitution of the mask 14 will concretely be described with reference to FIG. 6.

The mask 14 is divided into a plurality of regions, for example, first to fourth mask regions $M_1$ to $M_4$. An interval among these mask regions $M_1$ to $M_4$ is formed in an interval having an equal pitch Mp.

The respective line patterns 20 are formed in positions which do not overlap one another in the respective mask regions $M_1$ to $M_4$.

For description of the position of each line pattern 20, respective origins $Z_1$ to $Z_4$ are disposed with respect to the mask regions $M_1$ to $M_4$. The respective line patterns 20 are formed in positions having different distances from the origins $Z_1$ to $Z_4$ in the mask regions $M_1$ to $M_4$.

For example, two line patterns 20 are separate from each other by a predetermined pitch in the mask region $M_1$, and the line pattern 20 on the right side in the drawing is formed in a position aligned with the origin $Z_1$.

In the mask region $M_2$, two line patterns 20 are separate from each other by the same pitch as the pitch of the line patterns 20 of the mask region $M_1$, and are formed on the left side of the origin $Z_2$, for example, by a line pattern width.

In the mask region $M_3$, two line patterns 20 are separate from each other by the same pitch as the pitch of the line patterns 20 of the mask region $M_1$, and are formed on the left side from the origin $Z_3$, for example, by a length twice that of the line pattern width.

In the mask region $M_4$, two line patterns 20 are separate from each other by the same pitch as the pitch of the line patterns 20 of the mask region $M_1$, and are formed on the left side from the origin $Z_4$, for example, by a length three times that of the line pattern width. In the mask region $M_4$, the shown left line pattern 20 is formed on the leftmost side of the mask region $M_4$.

Each line pattern 20 is formed so that the laser irradiated region on the a-Si film has, for example, a beam width of about 5 µm or less and a pitch of 1 µm or more.

For a condition for forming the polycrystalline Si film having a predetermined or larger crystal particle diameter, the laser irradiated region on the a-Si film has each beam width of about 5 µm or less and a pitch Mp of 1 µm or more.

The condition that the beam width is 5 µm or less influences a thickness of the a-Si film formed on the glass substrate 10. When the a-Si film is irradiated, for example, with a single line beam, the crystal grows toward a middle portion from an outer edge of the line beam, and the whole surface of the laser irradiated region is poly-crystallized on this condition.

The condition that the pitch Mp of the beam width is 1 µm or more is influenced by the width of the line beam and the thickness of the a-Si film, and changes. This condition undergoes a heat influence from the adjacent line pattern, unless the interval of the respective line beams is 1 µm or more based on at least a general resolution and heat diffusion distance of the optical system.

The glass substrate 10 is laid on an XYZ tilt stage 21. The XYZ tilt stage 21 moves the glass substrate 10 in X, Y, and Z directions. The X, Y, and Z directions cross at right angles to one another. The XYZ tilt stage 21 raster-scans the pulse laser on the glass substrate 10 by the movement of the XYZ directions.

Concretely, the XYZ tilt stage 21 moves, for example, the glass substrate 10 continuously in the X direction at a conveyance speed synchronized with the repeated frequency of the pulse laser. In this case, the conveyance direction is a positive or negative X direction.

Moreover, the XYZ tilt stage 21 moves the glass substrate 10 in the Y direction by a distance corresponding to the width of the pulse laser beam.

Subsequently, the XYZ tilt stage 21 again moves the glass substrate 10 continuously in the X direction at the conveyance speed synchronized with the repeated frequency of the pulse laser. In this case, the X direction of the conveyance is reverse to the previous X direction, that is, the negative or positive X direction.

Thereafter, the XYZ tilt stage 21 repeats the aforementioned movement.

The XYZ tilt stage 21 moves the glass substrate 10, for example, at a conveyance speed of about 200 to 500 mm/s.

A controller 22 controls the XYZ tilt stage 21 to move the glass substrate 10 at a constant speed so that the pulse laser raster-scans the glass substrate 10. Moreover, the controller 22 controls the excimer laser 11 to emit the pulse laser at a constant timing a plurality of times.

The controller 22 irradiates the respective laser irradiated regions disposed adjacent to one another on the a-Si film with the pulse laser transmitted through the different line patterns 20. Moreover, the controller 22 moves the glass substrate 10 so that the respective boundaries of the laser irradiated regions adjacent to one another contact one another.

A focus displacement meter 23 measures displacement with the a-Si film on the glass substrate 10, and feeds a displacement signal back to the XYZ tilt stage 21. The XYZ tilt stage 21 vertically moves the glass substrate 10 in the Z direction based on the fed-back displacement signal. Thereby, an image of a mask pattern is formed on the a-Si film on the glass substrate 10.

An operation of the apparatus constituted as described above will next be described.

A manufacturing process of a p-Si TFT liquid crystal display includes a photolithography process. The photolithography process includes a process of forming an a-Si thin film on the glass substrate 10, a process of coating the thin film with a resist, a process of performing an exposure processing, a developing process, a process of an etching processing, and a process of removing the resist.

The photolithography process includes a process of poly-crystallizing the a-Si film on the glass substrate 10.

The method of poly-crystallizing the a-Si film on the glass substrate 10 is carried out as follows.

The excimer laser 11 intermittently outputs the pulse laser, for example, at a repeated frequency of 200 to 500 Hz. The pulse laser is emitted to the mask 14 from the variable attenuator 12 through the lighting optical system 13.

The pulse laser is passed through the mask pattern formed on the mask 14, reaches the mirror 15, and is reflected by the mirror 15. The pulse laser reflected by the mirror 15 is emitted onto the a-Si film on the glass substrate 10 by the projection lens 16.

Moreover, the XYZ tilt stage 21 moves the glass substrate 10 in the X direction at the conveyance speed synchronized with the repeated frequency of the pulse laser beam. In this case, the conveyance direction is the positive or negative X direction.

Subsequently, the XYZ tilt stage 21 moves the glass substrate 10 in the Y direction by a distance corresponding to the width of the pulse laser beam.

Next, the XYZ tilt stage 21 again moves the glass substrate 10 continuously in the X direction. In this case, the conveyance direction is the negative or positive X direction.

Thereafter, the XYZ tilt stage 21 repeats the aforementioned movement.

The XYZ tilt stage 21 moves the glass substrate 10, for example, at the conveyance speed of about 200 to 500 mm/s.

The a-Si film on the glass substrate 10 is irradiated with first, second, third, . . . shots of pulse laser beams output from the excimer laser 11 through the mask 14.

Figure 7:
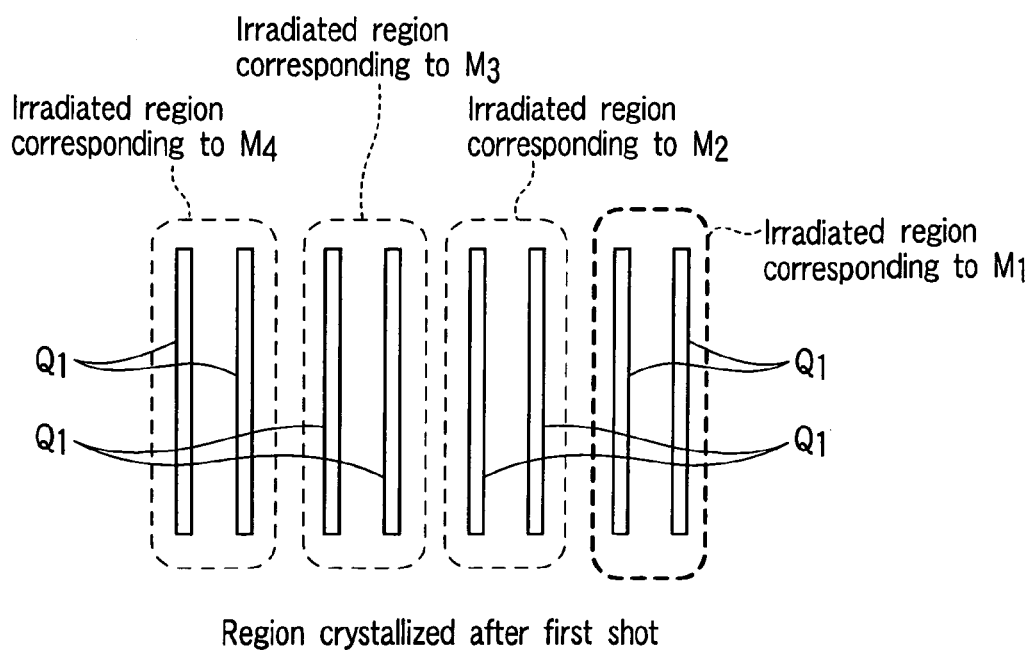
FIG. 7 is a diagram showing a region crystallized by a first shot of pulse laser beam.

FIG. 7 shows each laser irradiated region $Q_1$ poly-crystallized when the a-Si film is irradiated with the first shot of pulse laser beam. The pulse laser beam passed through each line pattern 20 of the mask 14 is emitted onto the a-Si film on the glass substrate 10. The a-Si film of the laser irradiated region $Q_1$ is poly-crystallized by these pulse laser beams.

Each laser irradiated region $Q_1$ is set such that each beam width is 5 $\mu$m or less and the pitch Mp is 1 $\mu$m or more. Thereby, in each laser irradiated region $Q_1$, the crystal grows toward the middle portion from the outer edge of the laser irradiated region, and the whole surface of the laser irradiated region $Q_1$ is poly-crystallized to form the polycrystalline Si film having the predetermined or larger crystal particle diameter.

Each laser irradiated region $Q_1$ does not undergo any heat influence from the adjacent laser irradiated region, and the a-Si film is poly-crystallized.

Figure 8:
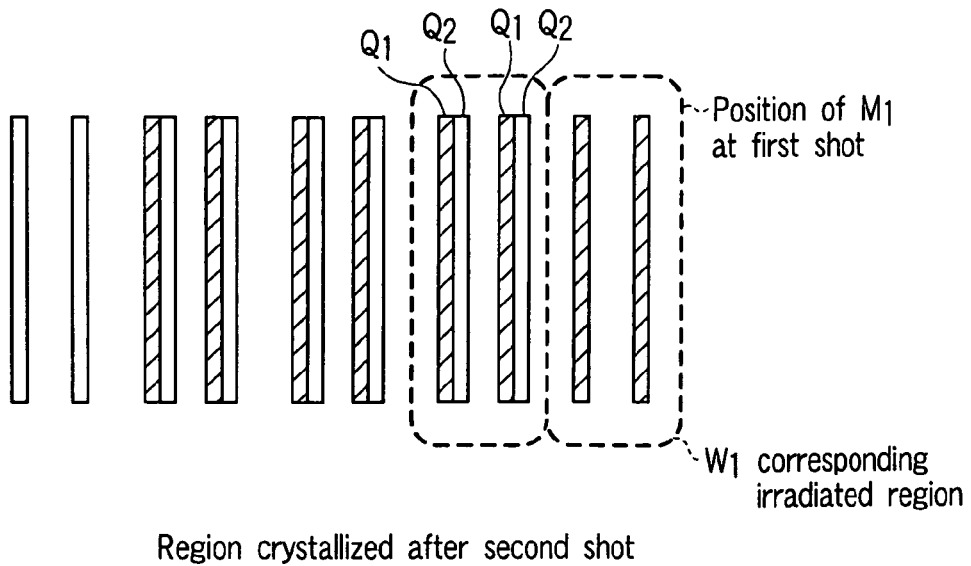
FIG. 8 is a diagram showing a region crystallized by a second shot of pulse laser beam.

Subsequently, FIG. 8 shows a laser irradiated region $Q_2$ poly-crystallized when the a-Si film is irradiated with the second shot of pulse laser beam.

Here, a region $W_1$ irradiated with the first shot of pulse laser will be noted in the following description.

At the second shot, the first mask region $M_1$ moves toward the left side in the drawing from the position irradiated with the first shot of pulse laser.

Therefore, the region $Q_2$ irradiated with the second shot of laser is adjacent to the laser irradiated region $Q_1$ poly-crystallized by the pulse laser beam passed through each line pattern 20 of the second mask region $M_2$ at the first shot.

Here, the laser irradiated regions $Q_1$ and $Q_2$ are formed by the pulse laser passed through the different line patterns 20, not by the pulse laser passed through the same line pattern 20.

Therefore, in the region $W_1$, the laser irradiated region $Q_2$ at the second shot does not undergo any heat influence from the adjacent laser irradiated region. The laser irradiated region $Q_2$ is obtained by poly-crystallizing the a-Si film in the predetermined or larger crystal particle diameter.

Figure 9:
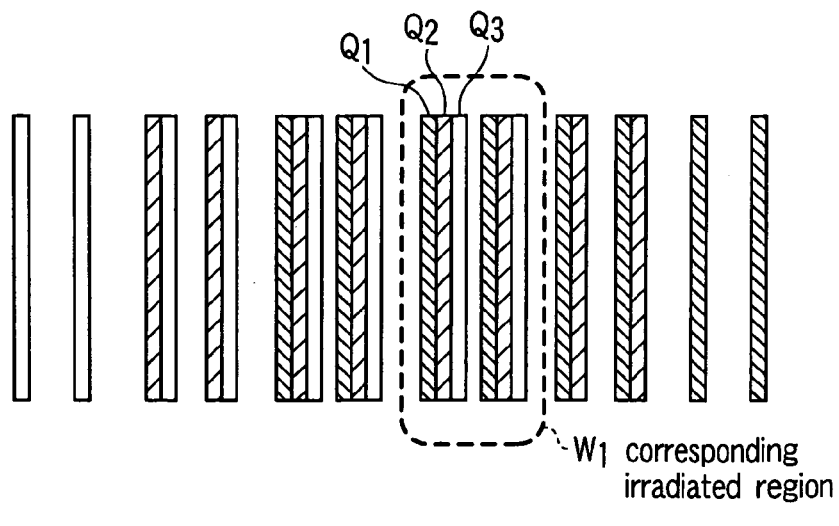
FIG. 9 is a diagram showing a region crystallized by a third shot of pulse laser beam.

Next, FIG. 9 shows a laser irradiated region $Q_3$ poly-crystallized when the a-Si film is irradiated with the third shot of pulse laser.

In the region $W_1$, the first mask region $M_1$ further moves toward the left side in the drawing from the position irradiated with the second shot of pulse laser.

Therefore, the laser irradiated region $Q_3$ at the third shot is adjacent to the region $Q_2$ poly-crystallized by the pulse laser beam passed through each line pattern 20 of the second mask region $M_2$ at the second shot.

The laser irradiated region $Q_3$ at the third shot does not undergo any heat influence from the adjacent laser irradiated region, and the a-Si film is poly-crystallized in the predetermined or larger crystal particle diameter.

Thereafter, similarly as described above, the pulse laser is emitted onto the a-Si film on the glass substrate 10 through the mask 14, and the glass substrate 10 is continuously moved by the operation of the XYZ tilt stage 21.

Figure 10:
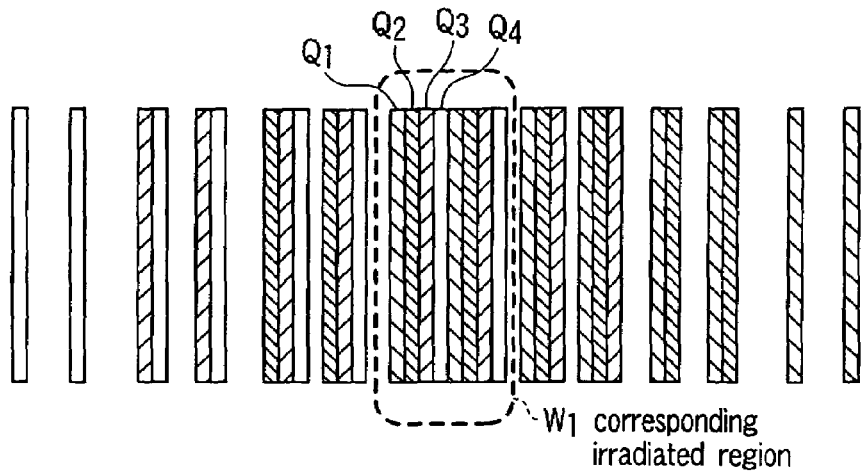
FIG. 10 is a diagram showing a region crystallized by a fourth shot of pulse laser beam.
Figure 11:
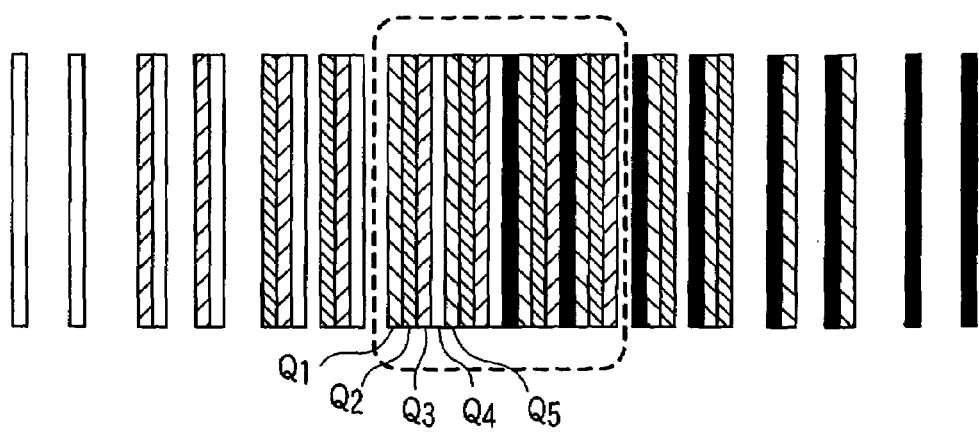
FIG. 11 is a diagram showing a region crystallized by a fifth shot of pulse laser beam.

FIG. 10 shows a laser irradiated region $Q_4$ poly-crystallized by a fourth shot of pulse laser beam. FIG. 11 shows a laser irradiated region $Q_5$ poly-crystallized by a fifth shot of pulse laser beam.

These regions $Q_4$, $Q_5$ do not undergo any heat influence from the adjacent laser irradiated region, and the a-Si film is poly-crystallized in the predetermined or larger crystal particle diameter.

Therefore, for the a-Si film on the glass substrate 10, a non laser irradiated region not irradiated with the pulse laser is successively filled up, and finally the whole surface of the a-Si film on the glass substrate 10 is poly-crystallized.

As described, in the first embodiment, the mask 14 is used in which the width of the line pattern 20 has a slit width to generate the heat gradient in the laser irradiated region obtained when irradiating the a-Si film with the pulse laser, and the pitch is formed in a pitch interval to generate the heat gradient in the laser irradiated region. The pulse laser is emitted onto the glass substrate 10 at a timing corresponding to the conveyance speed of the glass substrate 10. The a-Si film on the glass substrate 10 is irradiated with the pulse laser through the mask 14, and the glass substrate 10 is continuously moved by the operation of the XYZ tilt stage 21.

Thereby, while the glass substrate 10 is continuously moved, the a-Si film on the glass substrate 10 can continuously be formed into the polycrystalline Si film having the uniform and predetermined or larger crystal particle diameter.

Therefore, the polycrystalline Si film can be formed at the high speed. Mobility of an electron can be enhanced by forming the polycrystalline Si film having the large crystal particle diameter. For example, a capability of a transistor formed on the Si crystallized film is enhanced, and the capability of the p-Si TFT liquid crystal display can be enhanced.

In the manufacturing process of the p-Si TFT liquid crystal display, productivity in poly-crystallizing the a-Si film on the glass substrate 10 can be enhanced. Thereby, a high throughput can be obtained.

To poly-crystallize the a-Si film on the whole surface of the glass substrate 10, when the XYZ tilt stage 21 continuously moves the glass substrate 10 in the X direction, subsequently moves the glass substrate 10 in the Y direction, and again moves the substrate continuously in the X direction, an action of poly-crystallization is temporarily stopped. This is a natural operation from the shape of the glass substrate 10.

A second embodiment of the present invention will next be described with reference to the drawings.

In the laser processing apparatus of the second embodiment, the mask 14 shown in FIG. 5 is modified. Therefore, the laser processing apparatus will be described using the laser processing apparatus shown in FIG. 5.

Figure 12:
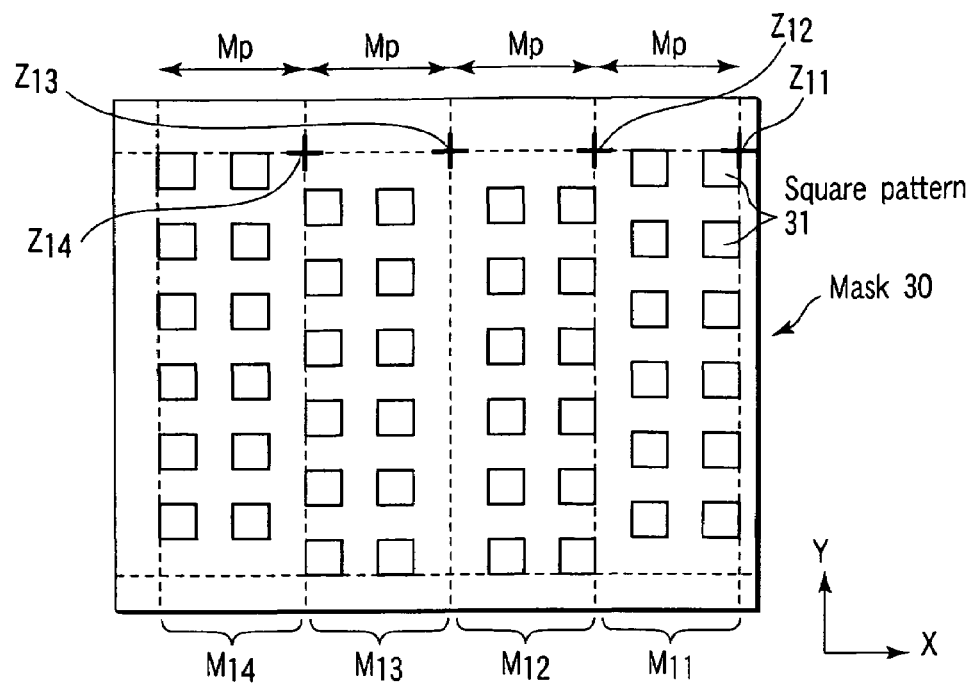
FIG. 12 is a constitution diagram of the mask in the laser processing apparatus according to a second embodiment of the present invention.

FIG. 12 is a constitution diagram of a mask 30 for use in the laser processing apparatus.

In the mask 30, square patterns 31 as openings are formed in the same direction. The width and pitch of the square pattern 31 are formed in the sizes to form the polycrystalline Si film having the predetermined or larger crystal particle diameter, when the a-Si film is irradiated with the pulse laser and poly-crystallized.

The width of each square pattern 31 is formed in a slit width length to generate the heat gradient in the laser irradiated region, when the a-Si film is irradiated with the pulse laser. The pitch between the square patterns 31 is formed in the pitch interval to generate the heat gradient in the laser irradiated region, when the a-Si film is irradiated with the pulse laser.

A constitution of the mask 30 will concretely be described.

The mask 30 is divided into a plurality of divided regions, for example, first to fourth mask regions $M_{11}$ to $M_{14}$. Each interval among these mask regions $M_{11}$ to $M_{14}$ is formed in the interval having the equal pitch Mp.

The respective square patterns 31 are formed in positions which do not overlap one another in the respective mask regions $M_{11}$ to $M_{14}$.

For the description of the position of each square pattern 31, respective origins $Z_{11}$ to $Z_{14}$ are disposed with respect to the mask regions $M_{11}$ to $M_{14}$. The respective square patterns 31 are formed in positions having different distances from the origins $Z_{11}$ to $Z_{14}$ in the mask regions $M_{11}$ to $M_{14}$.

For example, in the mask region $M_{11}$, the plurality of square patterns 31 are arranged in two rows in the Y direction. These square patterns 31 are separated from one another at a predetermined pitch in the X and Y directions, and the square pattern 31 on the right side in the drawing is aligned with the origin $Z_{11}$.

In the mask region $M_{12}$, the plurality of square patterns 31 are arranged in two rows in the Y direction. These square patterns 31 are separated from one another at the predetermined pitch in the X and Y directions, and the square pattern 31 on the right side in the drawing is formed in a position apart from the origin $Z_{12}$ by a predetermined pitch in the Y direction.

In the mask region $M_{13}$, the plurality of square patterns 31 are arranged in two rows in the Y direction. These square patterns 31 are separated from one another at the predetermined pitch in the X and Y directions, and the square pattern 31 on the right side in the drawing is formed in a position apart from the origin $Z_{13}$ by the predetermined pitch in the X and Y directions.

In the mask region $M_{14}$, the plurality of square patterns 31 are arranged in two rows in the Y direction. These square patterns 31 are separated from one another at the predetermined pitch in the X and Y directions, and the square pattern 31 on the right side in the drawing is formed in a position apart from the origin $Z_{14}$ by the predetermined pitch in the X direction.

The width and pitch of the square pattern 31 have values such that the heat gradient is generated in the laser irradiated region in the a-Si film formed on the glass substrate 10. For example, the beam width of the laser irradiated region on the a-Si film is set to about 5 $\mu$m or less, and the pitch is set to about 5 $\mu$m or more.

An operation of the apparatus constituted as described above will next be described.

The excimer laser 11 intermittently outputs the pulse laser, for example, at a repeated frequency of 200 to 500 Hz. The pulse laser is emitted to the mask 30 from the variable attenuator 12 through the lighting optical system 13.

The pulse laser is passed through the mask pattern formed on the mask 30, reaches the mirror 15, and is reflected by the mirror 15. The pulse laser reflected by the mirror 15 is emitted onto the a-Si film on the glass substrate 10 by the projection lens 16.

Moreover, similarly as the first embodiment, the XYZ tilt stage 21 continuously moves the glass substrate 10 at the conveyance speed synchronized with the repeated frequency of the pulse laser beam.

The first, second, third, . . . shots of pulse laser beams output from the excimer laser 11 are emitted onto the a-Si film on the glass substrate 10 through the mask 30.

Figure 13:
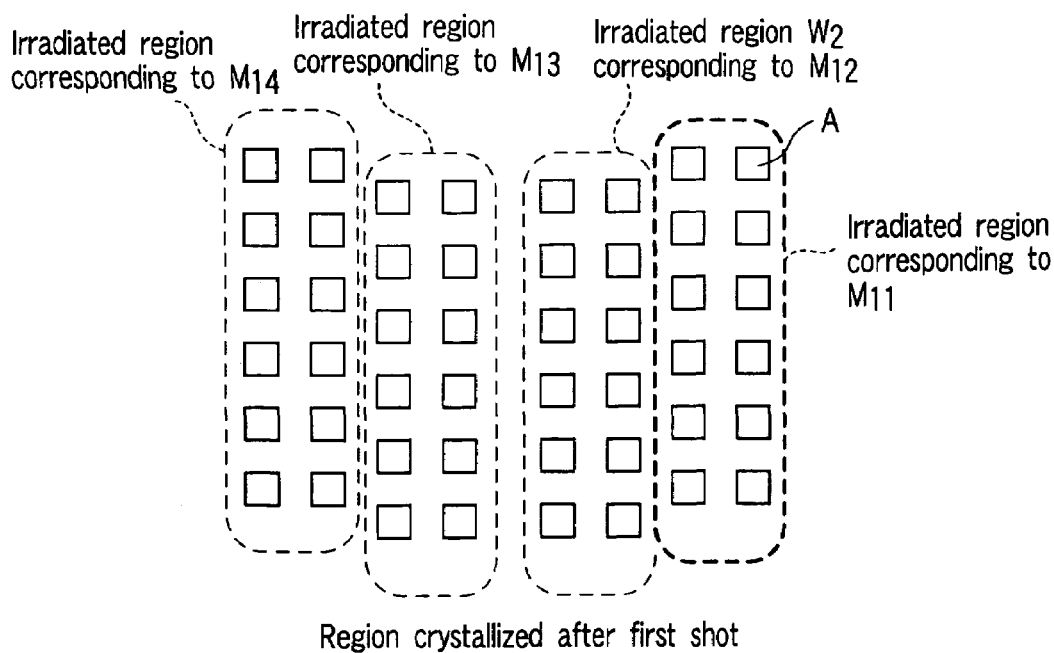
FIG. 13 is a diagram showing the region crystallized by the first shot of pulse laser beam.

FIG. 13 shows each square laser irradiated region A poly-crystallized when the a-Si film is irradiated with the first shot of pulse laser beam. The a-Si film on the glass substrate 10 is irradiated with the pulse laser beams passed through the respective square patterns 31 of the mask 30. The a-Si film of the laser irradiated region A with these pulse laser beams is poly-crystallized.

In each laser irradiated region A, the beam width is set to 5 µm or less, and the pitch Mp is set to 5 µm or more. Thereby, in the laser irradiated region A, the crystal grows toward the middle portion from the outer edge, and the whole surface of the laser irradiated region A is poly-crystallized to form the polycrystalline Si film having the predetermined or larger crystal particle diameter.

In each laser irradiated region A, the a-Si film is poly-crystallized without undergoing any heat influence from the adjacent laser irradiated region.

Here, a region $W_2$ irradiated with the first shot of pulse laser will be noted in the following description.

Figure 14:
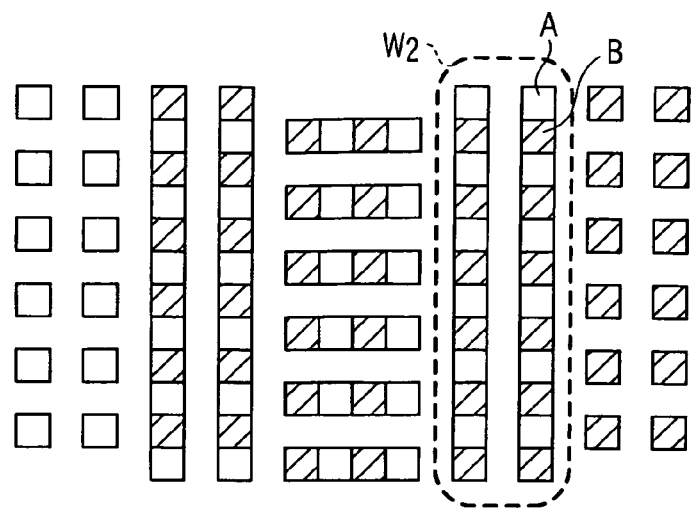
FIG. 14 is a diagram showing the region crystallized by the second shot of pulse laser beam.

FIG. 14 shows a laser irradiated region B poly-crystallized when the a-Si film is irradiated by the second shot of pulse laser. At the second shot, the laser irradiated region B is poly-crystallized by the pulse laser passed through each square pattern 31 of the second mask region $M_{12}$. The laser irradiated region B is adjacent to a lower edge of the region A poly-crystallized at the first shot.

The laser irradiated region B at the second shot does not undergo any heat influence from the adjacent laser irradiated region. In the laser irradiated region B, the a-Si film is poly-crystallized to have the predetermined or larger crystal particle diameter.

Figure 15:
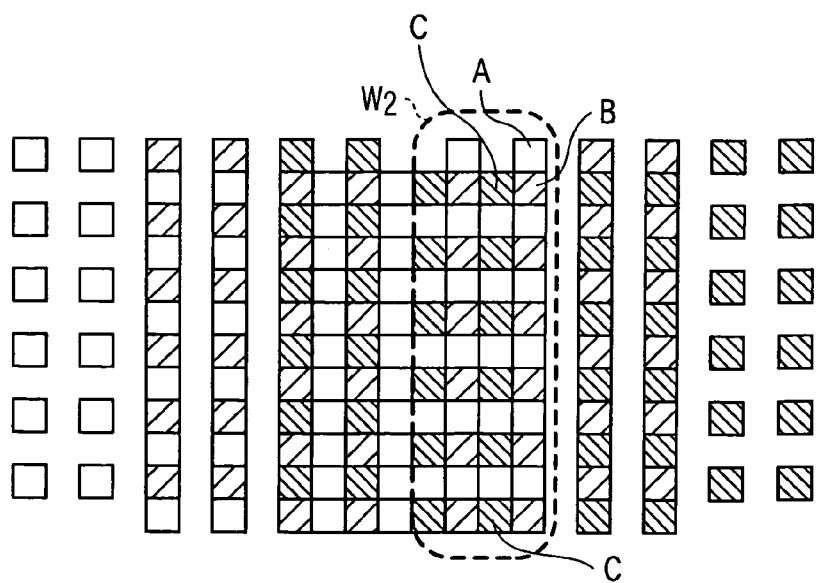
FIG. 15 is a diagram showing the region crystallized by the third shot of pulse laser beam.

Next, FIG. 15 shows a laser irradiated region C poly-crystallized when the a-Si film is irradiated with the third shot of pulse laser. At the third shot, the laser irradiated region C is poly-crystallized by the pulse laser passed through each square pattern 31 of the third mask region $M_{13}$. The laser irradiated region C is adjacent to a left edge of the laser irradiated region B poly-crystallized at the second shot.

The laser irradiated region C at the third shot does not undergo any heat influence from the adjacent laser irradiated region. In the laser irradiated region C, the a-Si film is poly-crystallized to have the predetermined or larger crystal particle diameter.

Figure 16:
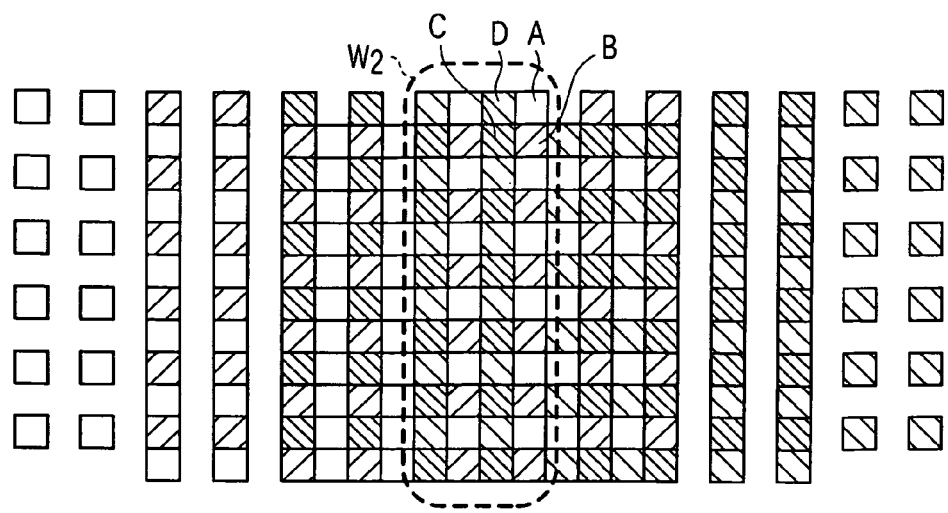
FIG. 16 is a diagram showing the region crystallized by the fourth shot of pulse laser beam.

Next, FIG. 16 shows a laser irradiated region D poly-crystallized when the a-Si film is irradiated by the fourth shot of pulse laser. At the fourth shot, the laser irradiated region D is poly-crystallized by the pulse laser passed through each square pattern 31 of the fourth mask region $M_{14}$. The laser irradiated region D is adjacent to an upper edge of the laser irradiated region C poly-crystallized at the third shot.

The laser irradiated region D at the fourth shot does not undergo any heat influence from the adjacent laser irradiated region. In the laser irradiated region D, the a-Si film is poly-crystallized to have the predetermined or larger crystal particle diameter.

Figure 17:
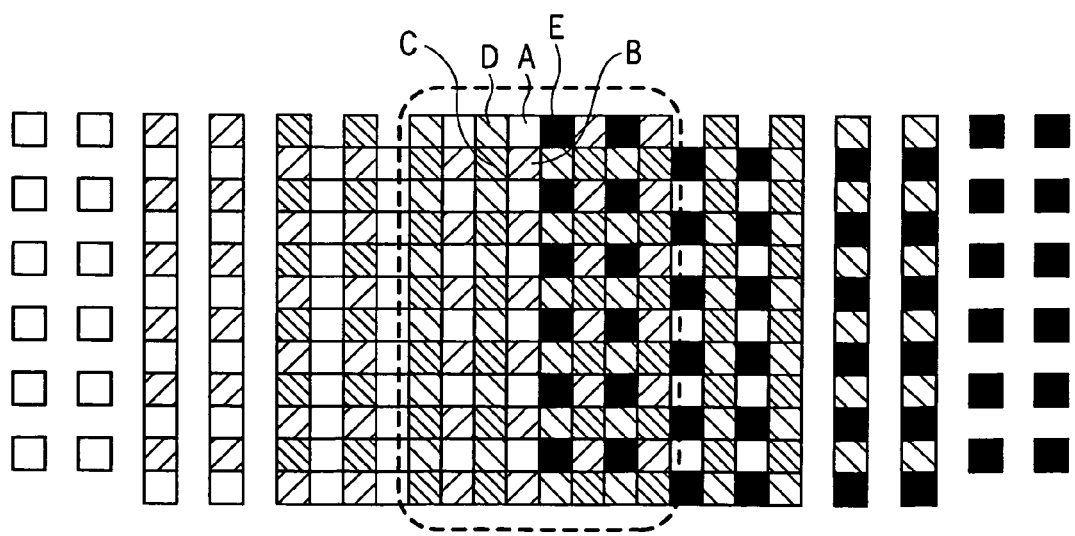
FIG. 17 is a diagram showing the region crystallized by the fifth shot of pulse laser beam.

Subsequently, the a-Si film is irradiated with the fifth shot of pulse laser. As shown in FIG. 17, a laser irradiated region E is poly-crystallized to have the predetermined or larger crystal particle diameter without undergoing any heat influence from the adjacent laser irradiated region.

Therefore, for the a-Si film on the glass substrate 10, the non laser irradiated region not irradiated with the pulse laser is successively filled up, and finally the whole surface of the a-Si film on the glass substrate 10 is poly-crystallized.

As described, in the second embodiment, the mask 30 is used in which the width of the square pattern 31 has the slit width length to generate the heat gradient in the laser irradiated region obtained when irradiating the a-Si film with the pulse laser, and the pitch is formed in the pitch interval to generate the heat gradient in the laser irradiated region obtained when irradiating the a-Si film with the pulse laser. Thereby, the second embodiment produces an effect similar to the effect of the first embodiment.

When the mask 30 is used, a micro crystal region is inevitably generated by irradiation with the fourth shot of pulse laser, and the size of the square pattern 31 remains at 5 µm or less, the pitch may be set to be twice as large as the size of the square pattern.

In this case, in order to fill up at least the non-irradiated region with the pulse laser, at least six or more shots of pulse laser beams are necessary, and the region on the mask 30 is divided into six.

A third embodiment of the present invention will next be described with reference to the drawings.

In the laser processing apparatus of the third embodiment, the constitution of the mask 14 shown in FIG. 5 is changed. Therefore, the laser processing apparatus will be described using the laser processing apparatus shown in FIG. 5.

Figure 18:
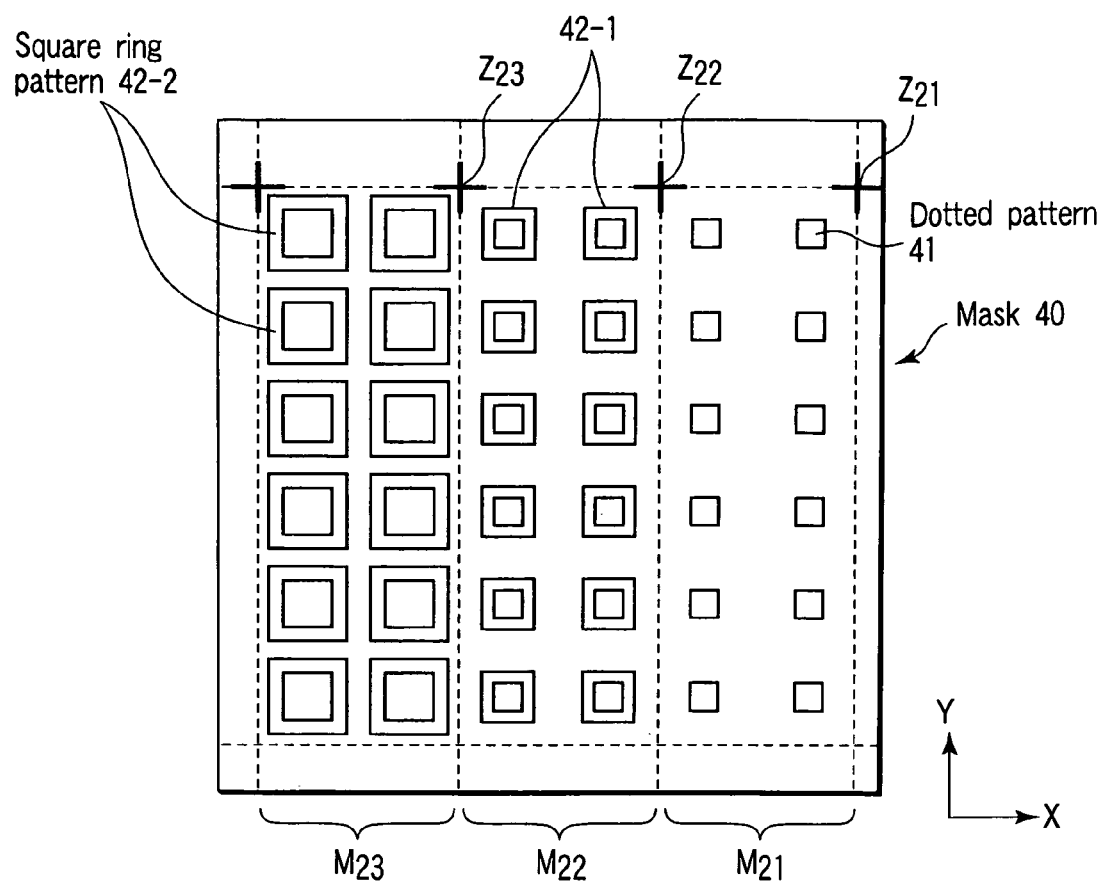
FIG. 18 is a constitution diagram of the mask in the laser processing apparatus according to a third embodiment of the present invention.

FIG. 18 is a constitution diagram of a mask 40 for use in the laser processing apparatus.

In the mask 40, a plurality of dotted openings (hereinafter referred to as a dotted pattern) 41, and a plurality of ring-shaped openings (hereinafter referred to as square ring patterns) 42-1, 42-2 are formed.

The dotted pattern 41 and square ring patterns 42-1, 42-2 are formed in positions which do not overlap one another in first to third mask regions $M_{21}$ to $M_{23}$.

These dotted pattern 41 and square ring patterns 42-1, 42-2 are formed in the respective widths and pitches such that the heat gradient appears at a time of irradiation of the glass substrate 10 with the pulse laser.

The constitution of the mask 40 will concretely be described.

The mask 40 is divided, for example, into first to third mask regions $M_{21}$ to $M_{23}$. Respective origins $Z_{21}$ to $Z_{23}$ are set in the mask regions $M_{21}$ to $M_{23}$.

In the first mask region $M_{21}$, the plurality of dotted patterns 41 are formed at the equal pitch in two rows in the Y direction. The dotted pattern 41 is set at such a value that the heat gradient is generated in the laser irradiated region in the a-Si film, for example, such that the beam width of the laser irradiated region on the a-Si film is about 5 µm or less.

In the second mask region $M_{22}$, the plurality of square ring patters 42-1 are formed at the equal pitch in two rows in the Y direction. For the square ring pattern 42-1, the size of a square formed inside a ring agrees with the size of the dotted pattern 41. The square ring pattern 42-1 is set at such a value that the heat gradient is generated in the laser irradiated region in the a-Si film, for example, such that the beam width of the laser irradiated region on the a-Si film is about 5 µm or less.

In the third mask region $M_{23}$, the plurality of square ring patterns 42-2 are formed at the equal pitch in two rows in the Y direction. For the square ring pattern 42-2, the size of the square formed inside the ring agrees with an outer size of the square ring pattern 42-2. The square ring pattern 42-2 is set at such a value that the heat gradient is generated in the laser irradiated region in the a-Si film, for example, such that the beam width of the laser irradiated region on the a-Si film is about 5 µm or less.

A distance between a center of the dotted pattern 41 and the origin $Z_{21}$, the distance between the center of the square ring pattern 42-1 and the origin $Z_{22}$, and the distance between the center of the square ring pattern 42-2 and the origin $Z_{23}$ are substantially the same.

Therefore, when the first to third mask regions $M_{21}$ to $M_{23}$ are superposed upon one another, the dotted pattern 41 is disposed in the center, the square ring pattern 42-1 is disposed in the outer periphery of the dotted pattern 41, and the square ring pattern 42-2 is disposed in the outer periphery of the square ring pattern 42-1.

The operation of the apparatus constituted as described above will next be described.

The method of poly-crystallizing the a-Si film formed on the glass substrate 10 in the manufacturing process of the p-Si TFT liquid crystal display is carried out as follows.

The excimer laser 11 intermittently outputs the pulse laser beam, for example, at the repeated frequency of 200 to 500 Hz. The pulse laser is emitted to the mask 40 from the variable attenuator 12 through the lighting optical system 13.

The pulse laser is passed through the mask pattern formed on the mask 40, reaches the mirror 15, and is reflected by the mirror 15. The pulse laser reflected by the mirror 15 is emitted onto the a-Si film on the glass substrate 10 by the projection lens 16.

Moreover, similarly as the first embodiment, the XYZ tilt stage 21 continuously moves the glass substrate 10 at the conveyance speed synchronized with the repeated frequency of the pulse laser beam.

The first, second, third, . . . shots of pulse laser output from the excimer laser 11 are emitted onto the a-Si film on the glass substrate 10 through the mask 40.

Here, a laser irradiated region a with the pulse laser passed through the dotted pattern 41 of the first mask region $M_{21}$ will be noted in the following description.

Figure 19:
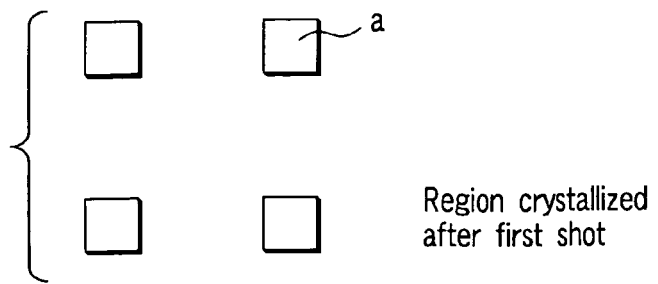
FIG. 19 is a diagram showing the region crystallized by the first shot of pulse laser beam.

FIG. 19 shows the laser irradiated region a on the a-Si film with the first shot of pulse laser beam passed through the dotted pattern 41.

In the laser irradiated region a, the beam width is 5 µm, and the pitch is equal at 5 µm. In the laser irradiated region a, the crystal grows toward the middle portion from the outer peripheral side, and the whole surface of the laser irradiated region a is poly-crystallized. The laser irradiated region a is poly-crystallized without undergoing any heat influence from the adjacent laser irradiated region a.

Therefore, the laser irradiated region a is poly-crystallized in the predetermined or larger crystal particle diameter.

Figure 20:
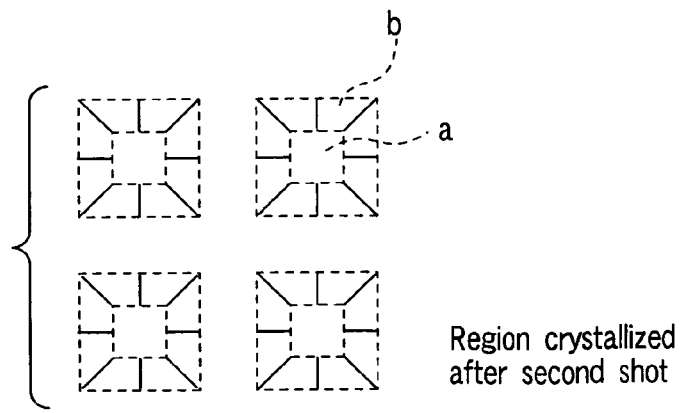
FIG. 20 is a diagram showing the region crystallized by the second shot of pulse laser beam.

Next, FIG. 20 shows a laser irradiated region b poly-crystallized, when the a-Si film is irradiated with the second shot of pulse laser passed through the square ring pattern 42-1.

Since the glass substrate 10 continuously moves in the X direction, the laser irradiated region b at the second shot forms the outer periphery of the laser irradiated region a at the first shot. The laser irradiated region b is a square ring pattern having a beam width of 5 µm. The laser irradiated region b is formed at the equal pitch of 5 µm.

Therefore, in the laser irradiated region b, the crystal grows toward the middle portion from the outer peripheral side, and the whole surface of the laser irradiated region b is poly-crystallized. The laser irradiated region b is poly-crystallized without undergoing any heat influence from the adjacent laser irradiated region b. Therefore, the laser irradiated region b is poly-crystallized in the predetermined or larger crystal particle diameter.

Figure 21:
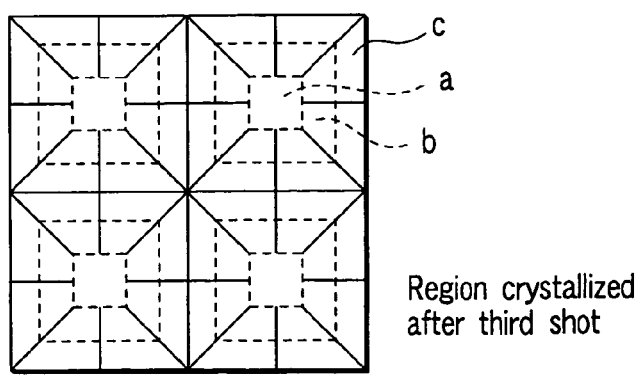
FIG. 21 is a diagram showing the region crystallized by the third shot of pulse laser beam.

Next, FIG. 21 shows a laser irradiated region c poly-crystallized, when the a-Si film is irradiated with the third shot of pulse laser passed through the square ring pattern 42-2.

Since the glass substrate 10 continuously moves in the X direction, the laser irradiated region c at the third shot forms the outer periphery of the laser irradiated region b at the second shot. The laser irradiated region c is a square ring pattern having a beam width of 5 µm. The laser irradiated region c is formed at the equal pitch of 5 µm.

Therefore, in the laser irradiated region c, the crystal grows toward the middle portion from the outer peripheral side, and the whole surface of the laser irradiated region c is poly-crystallized. The laser irradiated region c is poly-crystallized without undergoing any heat influence from the adjacent laser irradiated region c. Therefore, the laser irradiated region c is poly-crystallized in the predetermined or larger crystal particle diameter.

As a result, the whole surfaces of the laser irradiated regions a, b, c are poly-crystallized in the predetermined or larger crystal particle diameter by the irradiation with three shots of pulse laser.

Also in the other laser irradiated regions, similarly as described above, the a-Si film is repeatedly irradiated with the pulse laser as shown in FIGS. 19 to 21, and the a-Si film is continuously poly-crystallized.

The a-Si film on the glass substrate 10 is irradiated with the pulse laser passed through the mask 40 in this manner, and the glass substrate 10 continuously moves by the operation of the XYZ tilt stage 21.

Thereby, when the a-Si film is irradiated with three shots of pulse laser beams, for example, a Si film on the whole surface in the first mask region $M_{21}$ is poly-crystallized.

Therefore, for the a-Si film on the glass substrate 10, the non-irradiated region with the pulse laser is successively filled up, and finally the whole surface of the a-Si film on the glass substrate 10 is poly-crystallized.

As described above, according to the third embodiment, even when the mask 40 with the plurality of dotted patterns 41 and the plurality of square ring patterns 42-1, 42-2 formed thereon is used, the effect can be produced similarly as the first and second embodiments.

A fourth embodiment of the present invention will next be described with reference to the drawings.

In the laser processing apparatus of the fourth embodiment, the constitution of the mask 14 shown in FIG. 5 is changed. Therefore, the laser processing apparatus will be described using the laser processing apparatus shown in FIG. 5.

Figure 22:
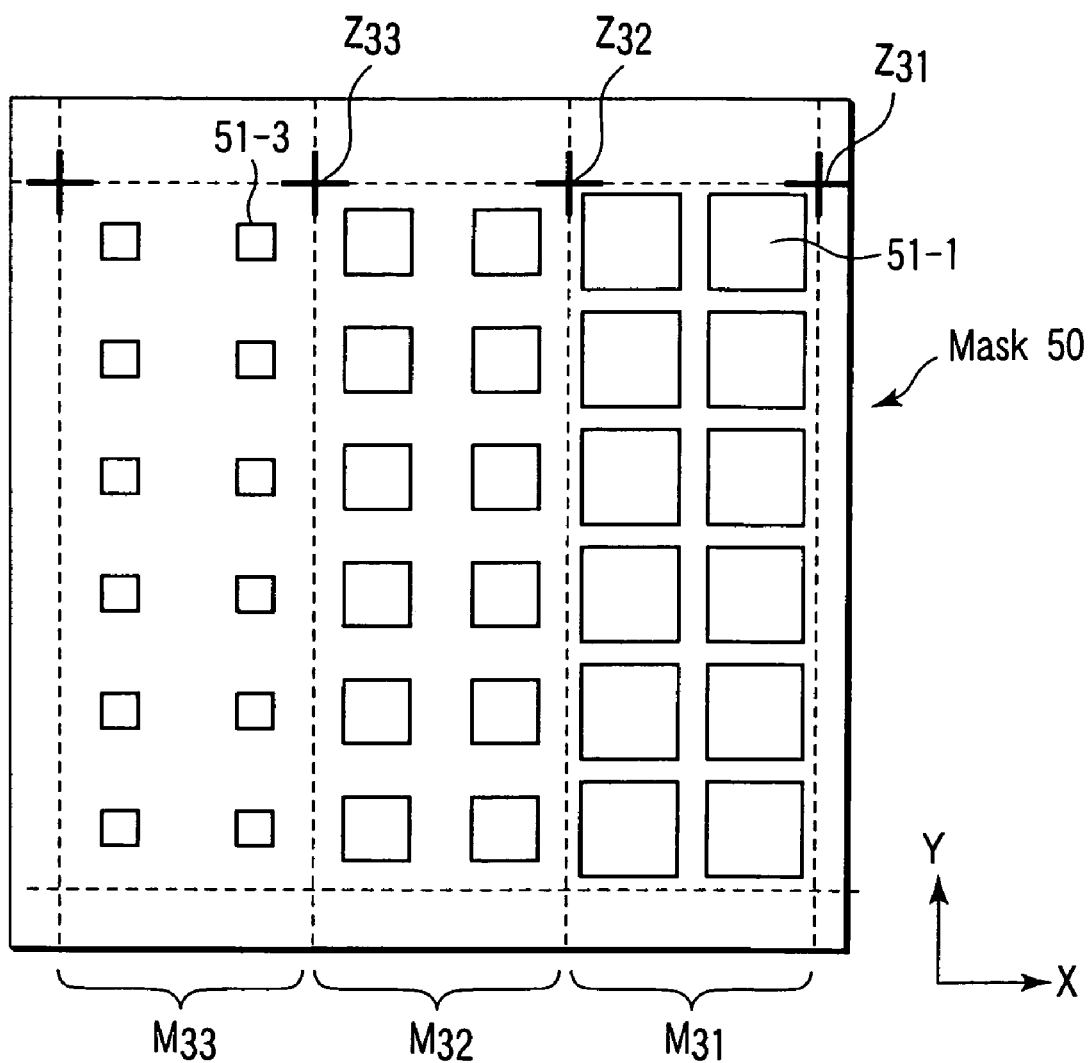
FIG. 22 is a constitution diagram of the mask in the laser processing apparatus according to a fourth embodiment of the present invention.

FIG. 22 is a constitution diagram of a mask 50 for use in the laser processing apparatus. In the mask 50, a plurality of polygonal pattern openings (hereinafter referred to as square patterns) 51-1 to 51-3 are formed in longitudinal and lateral directions (XY directions). For the square pattern 51, the width and pitch are formed in such values that the heat gradient appears in the laser irradiated region obtained by irradiating the glass substrate 10 with the pulse laser.

The constitution of the mask 50 will concretely be described.

The mask 50 is divided, for example, into first to third mask regions $M_{31}$ to $M_{33}$. Respective origins $Z_{31}$ to $Z_{33}$ are set in the first to third mask regions $M_{31}$ to $M_{33}$.

In the first mask region $M_{31}$, the plurality of square patterns 51-1 are formed at the equal pitch in two rows in the Y direction. The square pattern 51-1 is set at such a value that the heat gradient is generated in the laser irradiated region in the a-Si film, for example, such that the beam width of the laser irradiated region on the a-Si film is about 5 µm or less.

In the second mask region $M_{32}$, the plurality of square patterns 51-2 are formed at the equal pitch in two rows in the Y direction. The square pattern 51-2 is smaller than the square pattern 51-1 by a predetermined size. The square pattern 51-2 is set at such a value that the heat gradient is generated in the laser irradiated region in the a-Si film, for example, such that the beam width of the laser irradiated region on the a-Si film is about 5 µm or less.

In the third mask region $M_{33}$, the plurality of square patterns 51-3 are formed at the equal pitch in two rows in the Y direction. The square pattern 51-3 is smaller than the square pattern 51-2 by a predetermined size.

The square pattern 51-3 is set at such a value that the heat gradient is generated in the laser irradiated region in the a-Si film, for example, such that the beam width of the laser irradiated region on the a-Si film is about 5 µm or less.

The distance between the center of the square pattern 51-1 and the origin $Z_{31}$, the distance between the center of the square pattern 51-2 and the origin $Z_{32}$, and the distance between the center of the square pattern 51-3 and the origin $Z_{33}$ are the same.

Therefore, when the first to third mask regions $M_{31}$ to $M_{33}$ are superposed upon one another, the respective square patterns 51-1 to 51-3 are superposed upon one another in a concentric position.

The operation of the apparatus constituted as described above will next be described.

The method of poly-crystallizing the a-Si film formed on the glass substrate 10 in the manufacturing process of the p-Si TFT liquid crystal display is carried out as follows.

The excimer laser 11 intermittently outputs the pulse laser, for example, at the repeated frequency of 200 to 500 Hz. The pulse laser is emitted to the mask 50 from the variable attenuator 12 through the lighting optical system 13.

The pulse laser is passed through the mask pattern formed on the mask 50, reaches the mirror 15, and is reflected by the mirror 15. The pulse laser reflected by the mirror 15 is emitted onto the a-Si film on the glass substrate 10 by the projection lens 16.

Moreover, similarly as the first embodiment, the XYZ tilt stage 21 continuously moves the glass substrate 10 at the conveyance speed synchronized with the repeated frequency of the pulse laser beam.

The first, second, third, . . . shots of pulse laser beams output from the excimer laser 11 are emitted onto the a-Si film on the glass substrate 10 through the mask 40.

Here, a laser irradiated region T with the pulse laser passed through the square pattern 51-1 of the first mask region $M_{31}$ will be noted in the following description.

FIG. 23 shows a laser irradiated region $K_1$ on the a-Si film irradiated with the first shot of pulse laser beam passed through the square pattern 51-1.

In the laser irradiated region $K_1$, the beam width is 5 µm, and the pitch is equal at 5 µm. In the laser irradiated region $K_1$, the crystal grows toward the middle portion from the outer peripheral side, and the inside of the laser irradiated region $K_1$ is poly-crystallized in the predetermined or larger crystal particle diameter. The laser irradiated region $K_1$ is poly-crystallized without undergoing any heat influence from the adjacent laser irradiated region $K_1$.

Additionally, since the heat gradient is small in a middle portion L of the laser irradiated region $K_1$, the portion is micro-crystallized.

Next, FIG. 24 shows a laser irradiated region $K_2$ on the a-Si film irradiated with the second shot of pulse laser passed through the square pattern 51-2.

Since the glass substrate 10 continuously moves in the X direction, the laser irradiated region $K_2$ at the second shot forms the outer periphery of the laser irradiated region $K_1$ at the first shot. The laser irradiated region $K_2$ is a square pattern having a beam width of 5 µm. The laser irradiated region $K_2$ is formed at the equal pitch of 5 µm.

Therefore, in the laser irradiated region $K_2$, the crystal grows toward the middle portion from the outer peripheral side, and the inside of the laser irradiated region $K_2$ is poly-crystallized in the predetermined or larger crystal particle diameter. The laser irradiated region $K_2$ is poly-crystallized without undergoing any heat influence from the adjacent laser irradiated region $K_1$.

Additionally, since the heat gradient is small in the middle portion L of the laser irradiated region $K_2$, the portion is micro-crystallized.

Next, FIG. 25 shows a laser irradiated region $K_3$ on the a-Si film irradiated with the third shot of pulse laser passed through the square pattern 51-3.

Since the glass substrate 10 continuously moves in the X direction, the laser irradiated region $K_3$ at the third shot forms the outer periphery of the laser irradiated region $K_2$ at the second shot. The laser irradiated region $K_3$ is a square pattern having a beam width of 5 µm. The laser irradiated region $K_3$ is formed at the equal pitch of 5 µm.

Therefore, in the laser irradiated region $K_3$, the crystal grows toward the middle portion from the outer peripheral side, and the whole surface of the laser irradiated region $K_3$ is poly-crystallized. The laser irradiated region $K_3$ is poly-crystallized without undergoing any heat influence from the adjacent laser irradiated region $K_3$. Therefore, the laser irradiated region $K_3$ is poly-crystallized in the predetermined or larger crystal particle diameter.

As a result, the whole surfaces of the laser irradiated regions $K_1$, $K_2$, $K_3$ are poly-crystallized in the predetermined or larger crystal particle diameter by the irradiation with three shots of pulse laser.

Also in the other laser irradiated regions, similarly as described above, the a-Si film is repeatedly irradiated with the pulse laser as shown in FIGS. 23 to 25, and the a-Si film is continuously poly-crystallized.

The a-Si film on the glass substrate 10 is irradiated with the pulse laser passed through the mask 50 in this manner, and the glass substrate 10 continuously moves by the operation of the XYZ tilt stage 21.

Thereby, when the a-Si film is irradiated with three shots of pulse laser beams, for example, the Si film on the whole surface in the first mask region $M_{31}$ is poly-crystallized.

Therefore, for the a-Si film on the glass substrate 10, the non-irradiated region with the pulse laser is successively filled up, and finally the whole surface of the a-Si film on the glass substrate 10 is poly-crystallized.

As described above, according to the fourth embodiment, even when the mask 50 with the plurality of square patterns 51-1 to 51-3 formed thereon is used, needless to say, the effect can be produced similarly as the first to third embodiments.

A fifth embodiment of the present invention will next be described with reference to the drawings.

In the laser processing apparatus of the fifth embodiment, the constitution of the mask 14 shown in FIG. 5 is changed. Therefore, the laser processing apparatus will be described using the laser processing apparatus shown in FIG. 5.

FIG. 26 is a constitution diagram of a mask 60 for use in the laser processing apparatus. In the mask 60, a plurality of openings (hereinafter referred to as line patterns) 61 are formed in the X direction.

The line pattern 61 is formed in a direction corresponding to the growth direction of the crystal at a time of poly-crystallization of the a-Si film irradiated with the pulse laser on the glass substrate 10.

The constitution of the mask 60 will concretely be described.

The mask 60 is divided, for example, into first to fourth mask regions $M_{41}$ to $M_{44}$. The first to fourth mask regions $M_{41}$ to $M_{44}$ are divided at an equal interval of the pitch Mp. Respective origins $Z_{41}$ to $Z_{44}$ are set in the first to fourth mask regions $M_{41}$ to $M_{44}$.

The line patterns 61 are formed in the positions which do not overlap one another in the respective mask regions $M_{41}$ to $M_{44}$. The width and pitch of the line pattern 61 are formed in such values that the heat gradient is generated in the laser irradiated region in the a-Si film on the glass substrate 10. For example, the beam width of the laser irradiated region on the a-Si film is about 5 µm or less, and the pitch is 1 µm or more.

In the mask region $M_{41}$, the plurality of line patterns 61 are formed at the equal pitch in the Y direction. The position of one of the line patterns 61 is aligned with the origin $Z_{41}$.

In the mask region $M_{42}$, the plurality of line patterns 61 are formed at the equal pitch in the Y direction. The line pattern 61 deviates from the line pattern 61 formed in the mask region $M_{41}$ by the width of one line pattern 61.

In the mask region $M_{43}$, the plurality of line patterns 61 are formed at the equal pitch in the Y direction. The line pattern 61 deviates from the line pattern 61 formed in the mask region $M_{41}$ by the width of two line patterns 61.

In the mask region $M_{44}$, the plurality of line patterns 61 are formed at the equal pitch in the Y direction. The line pattern 61 deviates from the line pattern 61 formed in the mask region $M_{41}$ by the width of three line patterns 61.

The operation of the apparatus constituted as described above will next be described.

The method of poly-crystallizing the a-Si film formed on the glass substrate 10 in the manufacturing process of the p-Si TFT liquid crystal display is carried out as follows.

The excimer laser 11 intermittently outputs the pulse laser, for example, at the repeated frequency of 200 to 500 Hz. The pulse laser is emitted to the mask 60 from the variable attenuator 12 through the lighting optical system 13.

The pulse laser is passed through the mask pattern formed on the mask 60, reaches the mirror 15, and is reflected by the mirror 15. The pulse laser reflected by the mirror 15 is emitted onto the a-Si film on the glass substrate 10 by the projection lens 16.

Moreover, similarly as the first embodiment, the XYZ tilt stage 21 continuously moves the glass substrate 10 at the conveyance speed synchronized with the repeated frequency of the pulse laser beam.

The first, second, third, . . . shots of pulse laser output from the excimer laser 11 are emitted onto the a-Si film on the glass substrate 10 through the mask 60.

The a-Si film on the glass substrate 10 is irradiated with the pulse laser passed through the mask 60 in this manner, and the glass substrate 10 continuously moves by the operation of the XYZ tilt stage 21.

Thereby, when the a-Si film is irradiated with four shots of pulse laser, the Si film in each laser irradiated region is poly-crystallized in the predetermined or larger crystal particle diameter by these shots.

Since the respective laser irradiated regions with these four shots are adjacent to one another, the whole surfaces of the laser irradiated regions are continuously poly-crystallized.

Therefore, for the a-Si film on the glass substrate 10, the non-irradiated region with the pulse laser is successively filled up, and finally the whole surface of the a-Si film on the glass substrate 10 is poly-crystallized.

In this case, the polycrystal growth direction is vertical to the movement direction of the glass substrate 10 as shown in FIG. 27. That is, the laser irradiated region obtained by irradiating the a-Si film with the pulse laser beam passed through the line pattern 61 becomes linear.

Since the heat gradient increases in a narrower width direction of the laser irradiated region, the crystal grows in the width direction. The width direction is vertical to the movement direction of the glass substrate 10.

Additionally, when the mask 14 shown in FIG. 5 is used, the crystal grows in the narrower width direction of the laser irradiated region by the mask 14. The width direction is the movement direction (X direction) of the glass substrate 10.

As described above, according to the fifth embodiment, the mask 60 with the plurality of line patterns 61 formed in the X direction thereon is used, and the glass substrate 10 is continuously moved in the X direction.

The whole surface of the a-Si film on the glass substrate 10 can be poly-crystallized in the X direction (movement direction of the glass substrate 10). Therefore, when the mask 60 or the mask 14 shown in FIG. 5 is used, the growth direction of the poly-crystallization on the glass substrate 10 can be controlled.

Additionally, also in the fifth embodiment, needless to say, the effect can be produced similarly as the first to fourth embodiments.

A sixth embodiment of the present invention will next be described with reference to the drawings.

In the laser processing apparatus of the sixth embodiment, the constitution of the mask 14 shown in FIG. 5 is changed. Therefore, the laser processing apparatus will be described using the laser processing apparatus shown in FIG. 5.

Figure 28:
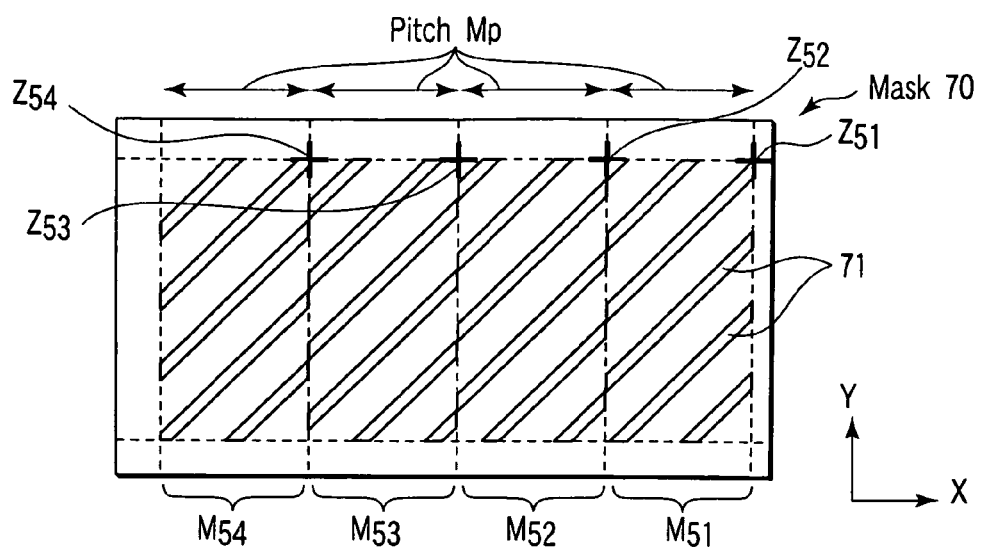
FIG. 28 is a constitution diagram of the mask in the laser processing apparatus according to a sixth embodiment of the present invention.

FIG. 28 is a constitution diagram of a mask 70 for use in the laser processing apparatus. In the mask 70, a plurality of pattern openings (hereinafter referred to as line patterns) 71 are formed in an oblique direction with respect to the X and Y directions.

The line pattern 71 is formed in a direction corresponding to the growth direction of the crystal at a time of the poly-crystallization of the a-Si film irradiated with the pulse laser beam on the glass substrate 10, for example, in a direction of 45° with respect to the X direction.

The constitution of the mask 70 will concretely be described.

The mask 70 is divided, for example, into first to fourth mask regions $M_{51}$ to $M_{54}$. The first to fourth mask regions $M_{51}$ to $M_{54}$ are divided at the equal interval of the pitch Mp. Respective origins $Z_{51}$ to $Z_{54}$ are set in the first to fourth mask regions $M_{51}$ to $M_{54}$.

The line patterns 71 are formed in the positions which do not overlap one another in the respective mask regions $M_{51}$ to $M_{54}$. The width and pitch of the line pattern 71 are formed in such values that the heat gradient is generated in the laser irradiated region in the a-Si film on the glass substrate 10. For example, the beam width of the laser irradiated region on the a-Si film is about 5 µm or less, and the pitch is 1 µm or more.

In the mask region $M_{51}$, the plurality of line patterns 71 are formed at the equal pitch and inclined, for example, by 45° with respect to the X direction. The position of one of the line patterns 71 is aligned with the origin $Z_{51}$.

In the mask region $M_{52}$, the plurality of line patterns 71 are formed at the equal pitch and inclined, for example, by 45° with respect to the X direction. The line pattern 71 deviates in the Y direction from the line pattern 71 formed in the mask region $M_{51}$ by the width of one line pattern 71.

In the mask region $M_{53}$, the plurality of line patterns 71 are formed at the equal pitch and inclined, for example, by 45° with respect to the X direction. The line pattern 71 deviates in the Y direction from the line pattern 71 formed in the mask region $M_{51}$ by the width of two line patterns 71.

In the mask region $M_{54}$, the plurality of line patterns 71 are formed at the equal pitch and inclined, for example, by 45° with respect to the X direction. The line pattern 71 deviates from the line pattern 71 formed in the mask region $M_{51}$ by the width of three line patterns 71.

The operation of the apparatus constituted as described above will next be described.

The method of poly-crystallizing the a-Si film formed on the glass substrate 10 in the manufacturing process of the p-Si TFT liquid crystal display is carried out as follows.

The excimer laser 11 intermittently outputs the pulse laser, for example, at the repeated frequency of 200 to 500 Hz. The pulse laser is emitted to the mask 70 from the variable attenuator 12 through the lighting optical system 13.

The pulse laser is passed through the mask pattern formed on the mask 70, reaches the mirror 15, and is reflected by the mirror 15. The pulse laser reflected by the mirror 15 is emitted onto the a-Si film on the glass substrate 10 by the projection lens 16.

Moreover, similarly as the first embodiment, the XYZ tilt stage 21 continuously moves the glass substrate 10 at the conveyance speed synchronized with the repeated frequency of the pulse laser beam.

The first, second, third, . . . shots of pulse laser output from the excimer laser 11 are emitted onto the a-Si film on the glass substrate 10 through the mask 70.

The a-Si film on the glass substrate 10 is irradiated with the pulse laser passed through the mask 70 in this manner, and the glass substrate 10 continuously moves by the operation of the XYZ tilt stage 21.

Thereby, when the a-Si film is irradiated with four shots of pulse laser, the Si film in each laser irradiated region is poly-crystallized in the predetermined or larger crystal particle diameter by these shots.

Since the respective laser irradiated regions with these four shots are adjacent to one another, the whole surfaces of the laser irradiated regions are continuously poly-crystallized.

Therefore, for the a-Si film on the glass substrate 10, the non-irradiated region with the pulse laser is successively filled up, and finally the whole surface of the a-Si film on the glass substrate 10 is poly-crystallized.

Figure 29:
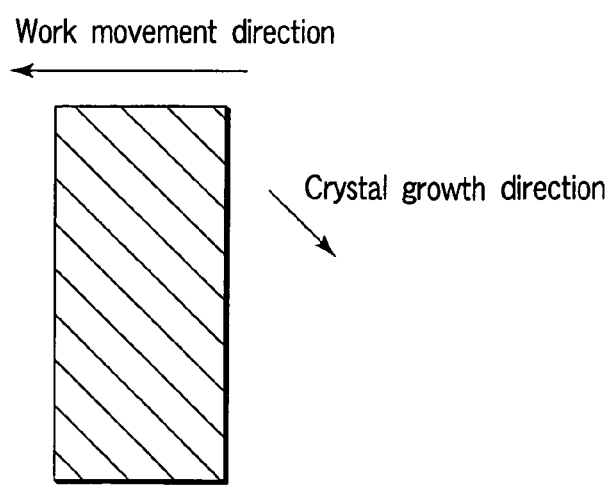
FIG. 29 is a diagram showing the growth direction of the polycrystal when the mask in the sixth embodiment is used.

As shown in FIG. 29, the polycrystal growth direction is vertical to the movement direction of the glass substrate 10. That is, the laser irradiated region obtained by irradiating the a-Si film with the pulse laser beam passed through the line pattern 71 becomes linear.

Since the heat gradient increases in the narrower width direction of the laser irradiated region, the crystal grows in the width direction. The width direction is vertical to the movement direction of the glass substrate 10.

As described above, according to the sixth embodiment, the mask 70 is used in which the plurality of line patterns 71 are formed and inclined by 45° with respect to the X direction, and the glass substrate 10 is continuously moved in the X direction.

Thereby, the whole surface of the a-Si film on the glass substrate 10 is inclined by 45° with respect to the X direction and poly-crystallized. Therefore, also in the sixth embodiment, needless to say, the effect can be produced similarly as the first to fifth embodiments.

A seventh embodiment of the present invention will next be described with reference to the drawings.

In the laser processing apparatus of the seventh embodiment, the constitution of the mask 14 shown in FIG. 5 is changed. Therefore, the laser processing apparatus will be described using the laser processing apparatus shown in FIG. 5.

FIG. 30 is a constitution diagram of a mask 80 for use in the laser processing apparatus.

In the mask 80, for example, four line patterns 81 are formed in the same direction. The width and pitch of the line pattern 81 are formed in such sizes that the polycrystalline Si film having the predetermined or larger crystal particle diameter is formed at the time of the poly-crystallization of the a-Si film irradiated with the pulse laser.

The width of each line pattern 81 is formed in a slit width length to generate the heat gradient in the laser irradiated region, when the a-Si film is irradiated with the pulse laser. The pitch between the line patterns 81 is formed in a pitch interval to generate the heat gradient in the laser irradiated region, when the a-Si film is irradiated with the pulse laser.

The constitution of the mask 80 will concretely be described.

The mask 80 is divided into a plurality of divided regions, for example, first to fourth mask regions $M_{61}$ to $M_{64}$. Respective origins $Z_{61}$ to $Z_{64}$ are disposed in the mask regions $M_{61}$ to $M_{64}$. Each interval among these mask regions $M_{61}$ to $M_{64}$ is formed in the interval having the equal pitch Mp.

The respective line patterns 81 are formed at the equal distance from the origins $Z_{61}$ to $Z_{64}$ in the mask regions $M_{61}$ to $M_{64}$. That is, the interval of the line patterns 81 is formed at the equal pitch.

The number of line patterns 81 in each of the mask regions $M_{61}$ to $M_{64}$ is not limited to one. When the intervals of all the line patterns 81 of the mask 80 have the equal pitch, a plurality of patterns may be formed in each of the mask regions $M_{61}$ to $M_{64}$.

Each line pattern 81 is formed so that the beam width of the laser irradiated region on the a-Si film is, for example, about 5 μm or less, and the pitch is 1 μm or more. This is the condition for forming the polycrystalline Si film having the predetermined or larger crystal particle diameter.

The method of poly-crystallizing the a-Si film formed on the glass substrate 10 in the manufacturing process of the p-Si TFT liquid crystal display is carried out as follows.

The excimer laser 11 intermittently outputs the pulse laser, for example, at the constant repeated frequency of 200 to 500 Hz. The pulse laser beam is emitted to the mask 80 from the variable attenuator 12 through the lighting optical system 13.

The pulse laser is passed through the mask pattern formed on the mask 80, reaches the mirror 15, and is reflected by the mirror 15. The pulse laser reflected by the mirror 15 is emitted onto the a-Si film on the glass substrate 10 by the projection lens 16.

Moreover, the XYZ tilt stage 21 continuously moves the glass substrate 10 at the constant conveyance speed synchronized with the repeated frequency of the pulse laser beam. In this case, the conveyance direction is the positive or negative X direction.

Subsequently, the XYZ tilt stage 21 moves the glass substrate 10 in the Y direction by the distance corresponding to the width of the pulse laser beam.

Next, the XYZ tilt stage 21 again moves the glass substrate 10 continuously in the X direction at the constant conveyance speed. In this case, the conveyance direction is the negative or positive X direction.

Thereafter, the XYZ tilt stage 21 repeats the movement at the constant conveyance speed. The XYZ tilt stage 21 moves the glass substrate 10, for example, at the conveyance speed of about 200 to 500 mm/s.

The a-Si film on the glass substrate 10 is irradiated with first, second, third, . . . shots of pulse laser beams output from the excimer laser 11 through the mask 80.

The a-Si film on the glass substrate 10 is irradiated with the pulse laser beam passed through the mask 80 in this manner, and the glass substrate 10 moves at the constant conveyance speed by the operation of the XYZ tilt stage 21.

FIG. 31 shows each laser irradiated region $F_1$ poly-crystallized when the a-Si film is irradiated with the first shot of pulse laser beam. The pulse laser beam passed through each line pattern 81 of the mask 80 is emitted onto the a-Si film on the glass substrate 10. The a-Si film of the laser irradiated region $F_1$ is poly-crystallized by these pulse laser beams.

Each laser irradiated region $F_1$ is set such that each beam width is 5 μm or less and the pitch Mp is 1 μm or more. Thereby, in each laser irradiated region $F_1$, the crystal grows toward the middle portion from the outer edge of the laser irradiated region $F_1$, and the whole surface of the laser irradiated region $F_1$ is poly-crystallized to form the poly-crystalline Si film having the predetermined or larger crystal particle diameter.

Each laser irradiated region $F_1$ does not undergo any heat influence from the adjacent laser irradiated region, and the a-Si film is poly-crystallized.

Figure 32:
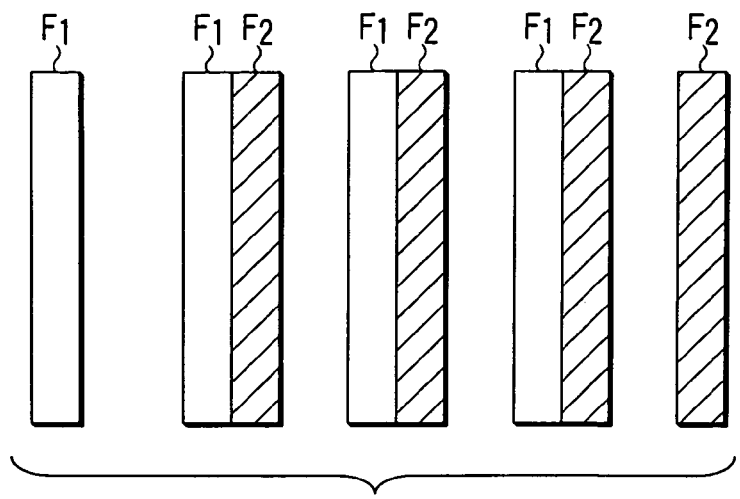
FIG. 32 is a diagram showing the region crystallized by the second shot of pulse laser beam.

Next, FIG. 32 shows a laser irradiated region $F_2$ poly-crystallized when the a-Si film is irradiated with the second shot of pulse laser beam.

The second shot of pulse laser beam is emitted onto the a-Si film at a timing at which the glass substrate 10 moves by the pitch interval of each line pattern 81.

Therefore, for the laser irradiated regions $F_2$ of the second shot, three laser irradiated regions $F_2$ are adjacent to the laser irradiated regions $F_1$ of the first shot. That is, the laser irradiated regions $F_1$ and $F_2$ are formed by the pulse laser beams passed through the different line patterns 81, not by the pulse laser beams passed through the same line pattern 81.

Therefore, even these laser irradiated regions $F_2$ do not undergo any heat influence from the adjacent laser irradiated region. The laser irradiated region $F_2$ is obtained by poly-crystallizing the a-Si film in the predetermined or larger crystal particle diameter.

Figure 33:
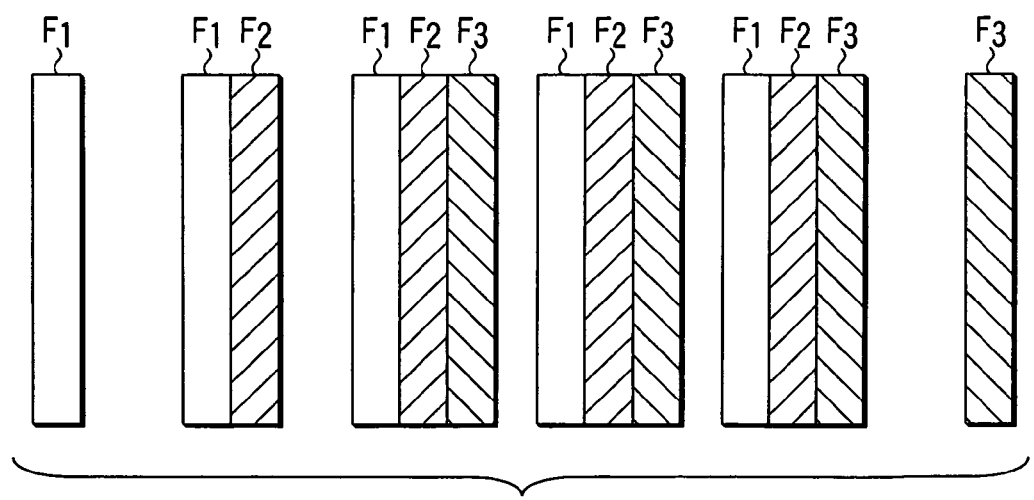
FIG. 33 is a diagram showing the region crystallized by the third shot of pulse laser beam.

Next, FIG. 33 shows a laser irradiated region $F_3$ poly-crystallized, when the a-Si film is irradiated with the third shot of pulse laser beam.

The third shot of pulse laser beam is emitted onto the a-Si film at a timing at which the glass substrate 10 further moves by the pitch interval of each line pattern 81.

Therefore, for the laser irradiated regions $F_3$ of the third shot, three laser irradiated regions $F_3$ are adjacent to the laser irradiated regions $F_2$ of the second shot. Even these laser irradiated regions $F_3$ do not undergo any heat influence from the adjacent laser irradiated region. The laser irradiated region $F_3$ is obtained by poly-crystallizing the a-Si film in the predetermined or larger crystal particle diameter.

Here, the respective laser irradiated regions $F_1, F_2, F_3, \ldots$ of the first, second, third, . . . shots of pulse laser beams have partially overlapped portions $g_1, g_2$ as shown in FIG. 34. Even with the overlapped portions $g_1, g_2$, the a-Si film is poly-crystallized in the predetermined or larger crystal particle diameter.

Thereafter, similarly as described above, the a-Si film on the glass substrate 10 is irradiated with the pulse laser beam through the mask 80, and the glass substrate 10 is moved at the constant conveyance speed by the operation of the XYZ tilt stage 21.

Therefore, in the a-Si film on the glass substrate 10, the non laser irradiated region not irradiated with the pulse laser beam is successively filled up, and finally the whole surface of the a-Si film on the glass substrate 10 is poly-crystallized.

As described above, in the seventh embodiment, the mask 80 with the respective line patterns 81 formed at the equal pitch thereon is used, the glass substrate 10 is moved at the constant conveyance speed, and the pulse laser beam is emitted at the constant timing.

Thereby, for the a-Si film on the glass substrate 10, the non-irradiated region with the pulse laser beam is successively filled up, and finally the whole surface of the a-Si film on the glass substrate 10 is poly-crystallized in the predetermined or larger crystal particle diameter.

An eighth embodiment of the present invention will next be described with reference to the drawings.

In the eighth embodiment, a method of manufacturing the p-Si TFT liquid crystal display using any one of the laser processing apparatuses of the first to seventh embodiments will be described.

FIG. 35 is a constitution diagram showing one example of the TFT liquid crystal display in a manufacturing process. A TFT liquid crystal display 90 includes: a plurality of pixel sections 91; a driver 92 of each pixel section 91 formed around the pixel section 91; and a peripheral circuit 93 including a gate array, D/A converter, and the like.

When the TFT liquid crystal display 90 is manufactured, the a-Si film is formed on the glass substrate of the TFT liquid crystal display 90. On the a-Si film, the polycrystalline Si film is formed in a region corresponding to the plurality of pixel sections 91, driver 92, and peripheral circuit 93.

For example, a memory and CPU are expected to be directly mounted particularly in the region corresponding to the driver 92 and peripheral circuit 93. In the region, a property of a film quality is demanded to be enhanced.

To form the polycrystalline Si film in the region corresponding to the plurality of pixel sections 91, the laser processing apparatus according to any one of the first to seventh embodiments, for example, the first embodiment is applied.

Figure 1:
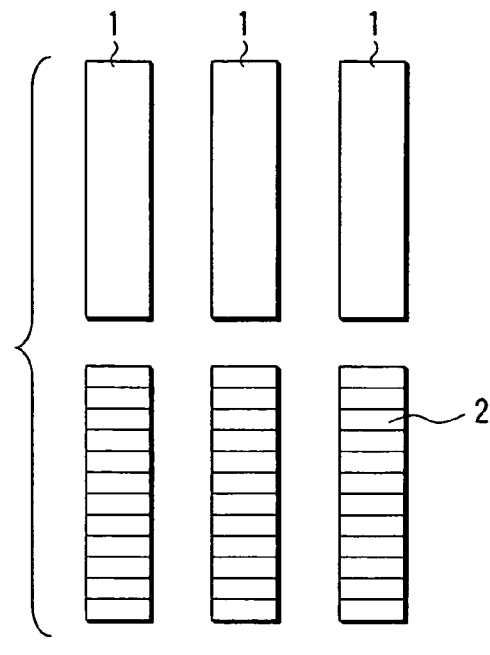
FIG. 1 is a schematic view showing a conventional method for forming a polycrystalline Si film.
Figure 3:
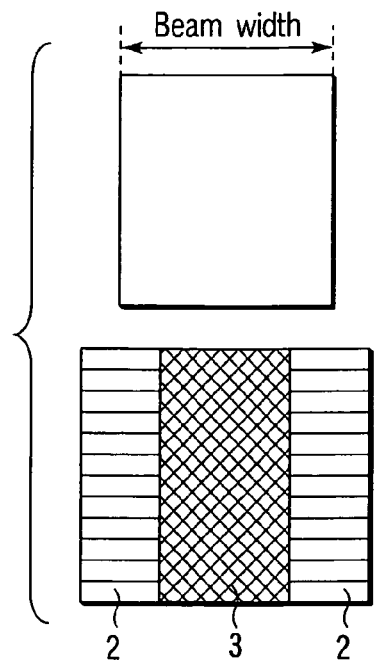
FIG. 3 is a schematic view showing a relation between a conventional laser beam width and micro crystal generation.
Figure 2:
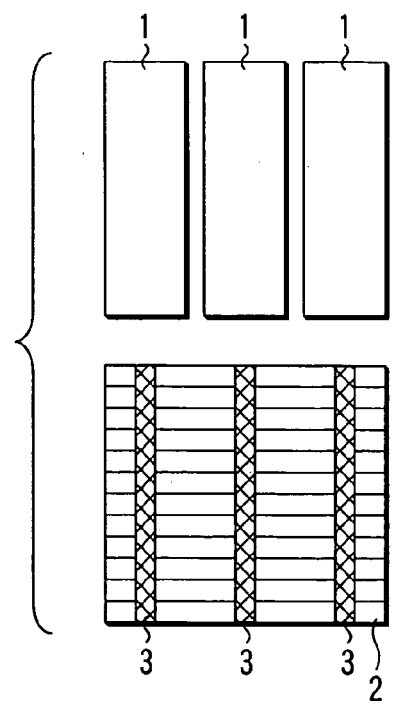
FIG. 2 is a schematic view showing a conventional method for narrowing a pitch of a repeated pattern and forming the polycrystalline Si film.
Figure 4:
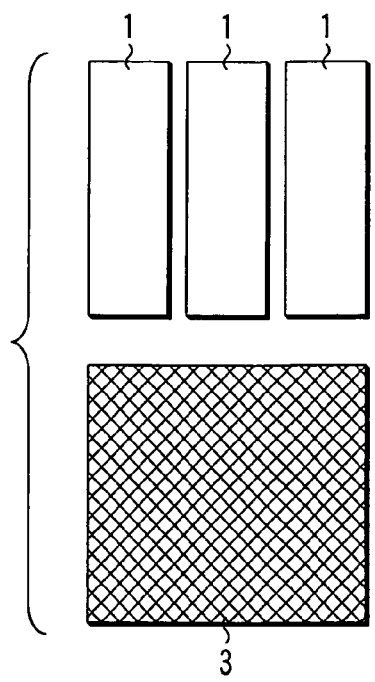
FIG. 4 is a schematic view showing a conventional method for narrowing the pitch of the repeated pattern and forming the polycrystalline Si film.

The pulse laser beam repeatedly output from the excimer laser 11 is passed through each line pattern 20 of the mask 14 shown in FIG. 2, and emitted onto the a-Si film corresponding to the pixel section 91 by the projection lens 16.

On the other hand, the XYZ tilt stage 21 continuously moves the glass substrate 10, for example, in the X direction at the conveyance speed synchronized with the repeated frequency of the pulse laser beam, next moves the substrate in the Y direction by a distance corresponding to a length of the line beam, and subsequently moves the substrate continuously in the X direction again.

Thereby, the non laser irradiated region of the a-Si film forming the pixel section 91 is successively filled up. Finally, the whole surface of the a-Si film on the pixel section 91 is poly-crystallized.

To form the polycrystalline Si film in the region corresponding to the plurality of drivers 92 and peripheral circuits 93, the laser processing apparatus according to any one of the first to seventh embodiments, for example, the first embodiment is applied.

The pulse laser beam passed through the mask 14 is emitted onto the a-Si film corresponding to the driver 92 and peripheral circuit 93 by the projection lens 16. The laser irradiated region is shown as a field 94 of the projection lens 16.

On the other hand, the XYZ tilt stage 21 moves the glass substrate 10 at the conveyance speed synchronized with the repeated frequency of the pulse laser beam. The glass substrate 10 continuously moves in a direction extending along a longitudinal direction of the driver 92 and peripheral circuit 93, for example, in the Y direction (or the X direction).

Finally the whole surface of the a-Si film on the driver 92 and peripheral circuit 93 is poly-crystallized by scanning the pulse laser beam.

Figure 36:
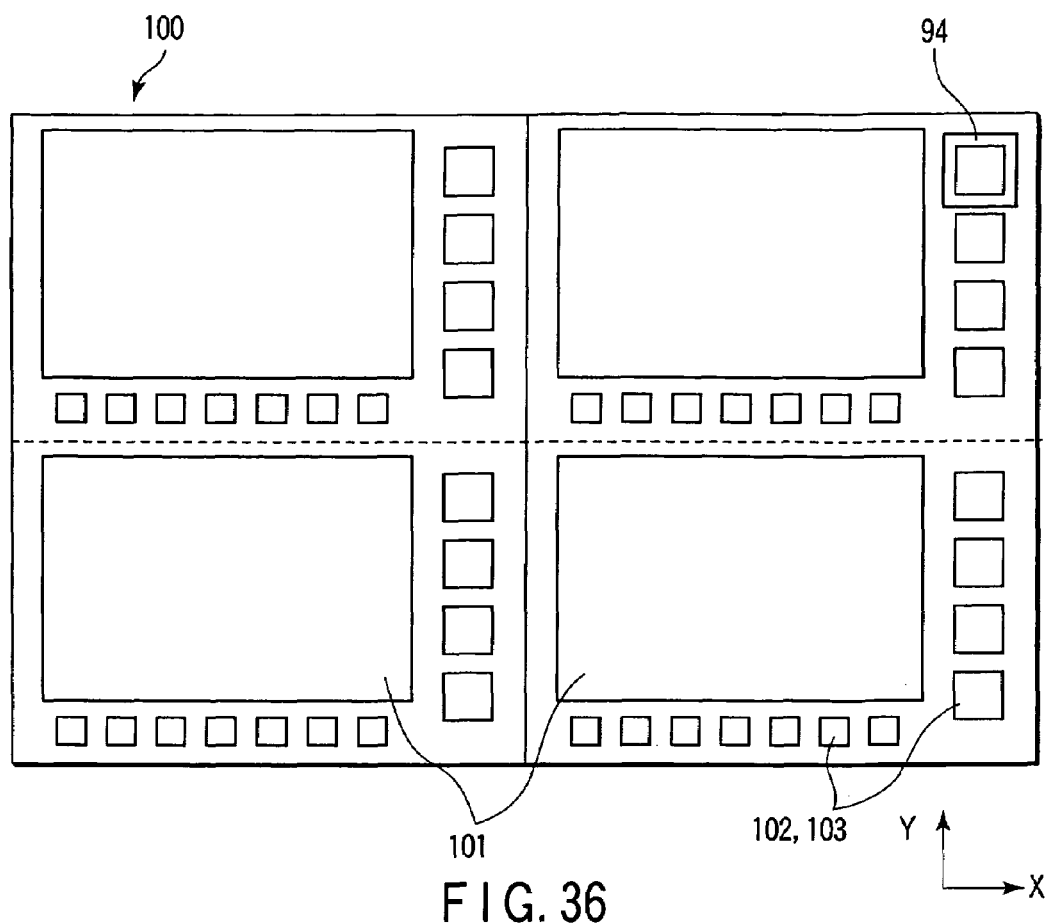
FIG. 36 is an explanatory view of the manufacturing method of another TFT liquid crystal display to which the laser processing apparatus of an eighth embodiment of the present invention is applied.

FIG. 36 is a constitution diagram showing one example of another TFT liquid crystal display in the manufacturing process.

A TFT liquid crystal display 100 includes: a plurality of pixel sections 101; a plurality of drivers 102 formed around the respective pixel sections 101; and a plurality of peripheral circuits 103 including the gate array, D/A converter, and the like.

A size of the driver 102 or the peripheral circuit 103 is formed to be smaller than a size of the field 94 of the projection lens 16.

To form the polycrystalline Si film in the region corresponding to the pixel sections 101 of the TFT liquid crystal display 100, the laser processing apparatus according to any one of the first to seventh embodiments, for example, the first embodiment is applied.

Figure 6:
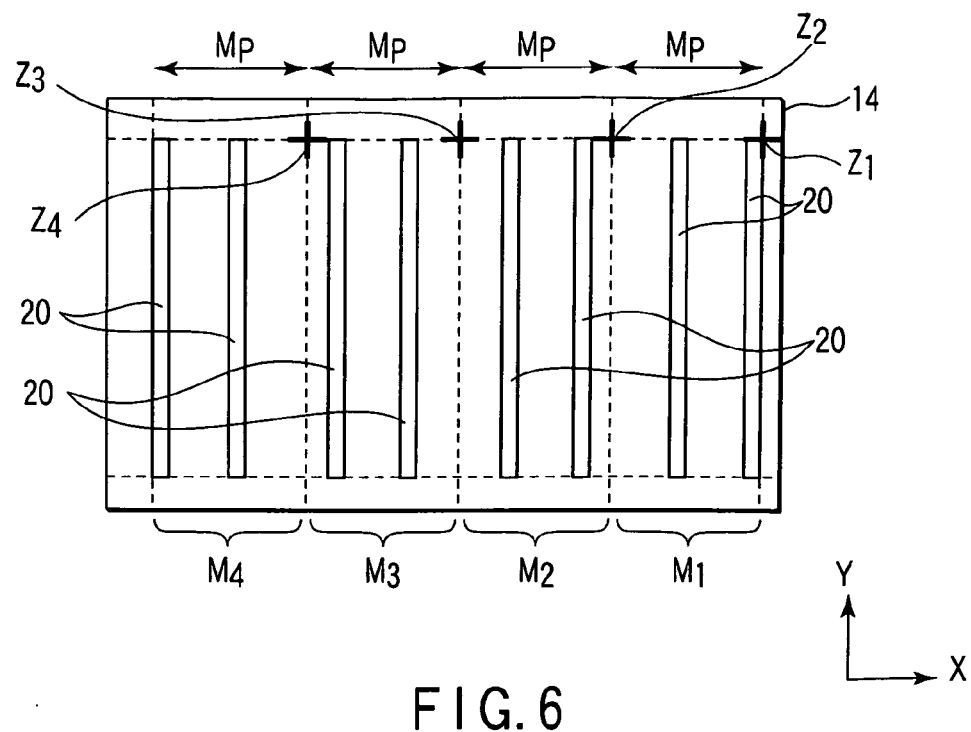
FIG. 6 is a constitution diagram of a mask in the laser processing apparatus according to the first embodiment of the present invention.

The pulse laser beam repeatedly output from the excimer laser 11 is passed through each line pattern 20 of the mask 14 shown in FIG. 6, and emitted onto the a-Si film corresponding to the pixel section 101 by the projection lens 16.

On the other hand, the XYZ tilt stage 21 continuously moves the glass substrate 10, for example, in the X direction at the conveyance speed synchronized with the repeated frequency of the pulse laser beam, next moves the substrate in the Y direction by the distance corresponding to the length of the line beam, and subsequently moves the substrate continuously in the X direction again.

Thereby, the non laser irradiated region of the a-Si film forming the pixel section 101 is successively filled up. Finally, the whole surface of the a-Si film on the pixel section 101 is poly-crystallized.

To form the polycrystalline Si film in the region corresponding to the plurality of drivers 102 and peripheral circuits 103, the laser processing apparatus according to any one of the first to seventh embodiments, for example, the first embodiment is applied.

The pulse laser beam passed through the mask 14 is emitted onto the a-Si film corresponding to the driver 102 and peripheral circuit 103 by the projection lens 16.

On the other hand, the XYZ tilt stage 21 moves the glass substrate 10 at the conveyance speed synchronized with the repeated frequency of the pulse laser beam. The glass substrate 10 continuously moves in a direction extending along a longitudinal direction of the driver 102 and peripheral circuit 103, for example, in the Y direction (or the X direction).

Finally the whole surface of the a-Si film on the driver 102 and peripheral circuit 103 is poly-crystallized by scanning the pulse laser beam.

As described above, according to the eighth embodiment, the regions corresponding to the plurality of pixel sections 91, 101, drivers 92, 102, and peripheral circuits 93, 103 in the TFT liquid crystal displays can be poly-crystallized.

Particularly the properties of the film qualities of the regions corresponding to the drivers 92, 102 and peripheral circuits 93, 103, on which the memory and CPU are expected to be directly mounted, can be enhanced.

In the TFT liquid crystal display 100 shown in FIG. 36, the size of the driver 102 or the peripheral circuit 103 is formed to be smaller than the size of the field 93 of the projection lens 16. Therefore, the overlap in the irradiation with the pulse laser beam can be reduced. A capability of the polycrystalline Si film can be enhanced.

In the eighth embodiment, all the regions corresponding to the plurality of pixel sections 91, 101, drivers 92, 102, and peripheral circuits 93, 103 are poly-crystallized. This is not limited. For example, only regions for forming semiconductor devices such as CPU and memory may be poly-crystallized in the regions of the drivers 92, 102 and peripheral circuits 93, 103.

A ninth embodiment of the present invention will next be described with reference to the drawings.

Figure 37:
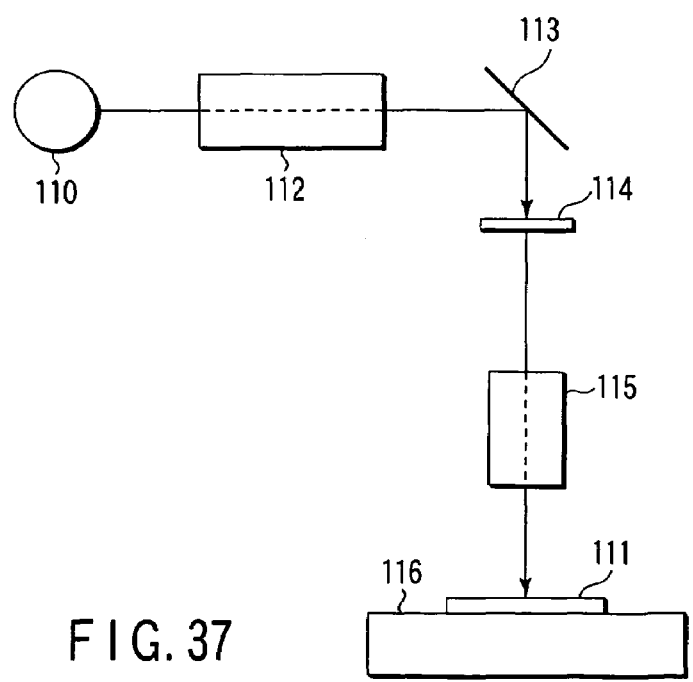
FIG. 37 is a constitution diagram of an exposure device according to a ninth embodiment of the present invention.

FIG. 37 is a schematic constitution diagram of an exposure device such as a stepper. A laser deice 110 outputs a laser beam for subjecting a work 111 to an exposure processing. The work 111 is, for example, the glass substrate of the liquid crystal display.

A lighting optical system 112 and mirror 113 are disposed on an optical path of the laser beam. A mask 114 and image forming lens system 115 are disposed on a reflected light path of the mirror 113. The lighting optical system 112 shapes the laser beam output from the laser device 110 and uniforms a light strength.

A plurality of pattern openings are formed in the mask 114. The width and pitch of the pattern opening is set to a value, for example, in accordance with the exposure processing of the glass substrate 111 of the liquid crystal display. For example, the mask 14 shown in FIG. 6, mask 30 shown in FIG. 12, mask 40 shown in FIG. 18, mask 50 shown in FIG. 22, mask 60 shown in FIG. 26, mask 70 shown in FIG. 28, and mask 80 shown in FIG. 30 can be applied to the mask 114.

An XYZ stage 116 has the glass substrate 111 mounted thereon, and moves the glass substrate 111 in the XY directions and Z direction. The XYZ stage 116 moves the glass substrate 111 by each predetermined distance in one direction.

When the XYZ stage 116 moves the glass substrate 111 by each predetermined distance, the respective laser irradiated regions on the glass substrate 111 irradiated with the laser beams passed through the pattern openings of the mask 114 do not overlap one another.

The operation of the apparatus constituted as described above will next be described.

As the mask 114, for example, the mask 14 shown in FIG. 6 is applied.

For example, in the manufacturing process of the p-Si TFT liquid crystal display, the thin a-Si film is formed on the glass substrate 111, and the thin film is coated with a resist and subjected to the exposure processing. Thereafter, the manufacturing process includes image developing, etching processing, and removing of the resist.

The exposure device of the ninth embodiment is used in the exposure processing during the manufacturing process.

The first shot of laser beam output from the laser device 110 is shaped and uniformed by the lighting optical system 112. The laser beam is reflected by the mirror 113, and emitted onto the mask 114.

The laser beam is passed through the line pattern 20 of the mask 114, and emitted onto the glass substrate 111 of the liquid crystal display by a projection lens system.

Figure 38:
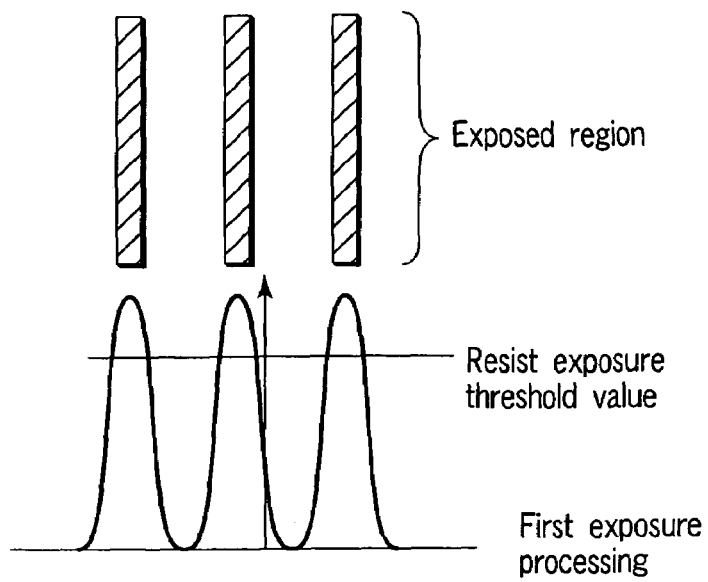
FIG. 38 is a schematic view showing a first exposure processing in the exposure device.

FIG. 38 shows a linear exposed region and exposure strength by the first shot of laser beam. The surface of the glass substrate 111 is coated with a resist film. The resist film is subjected to the exposure processing in the exposed region having an exposure strength higher than a resist exposure threshold value.

Subsequently, the XYZ stage 116 moves the glass substrate 111 by a distance corresponding to the half of the pitch of the line pattern of the mask 114. The movement direction of the glass substrate 111 is vertical to the longitudinal direction of the line pattern 20 of the mask 114.

Next, the laser device 110 outputs the second shot of laser beam. The laser beam is shaped and uniformed by the lighting optical system 112, and reflected by the mirror 113. The laser beam is passed through the line pattern 20 of the mask 114 and emitted onto the glass substrate 111 by the projection lens system.

Figure 39:
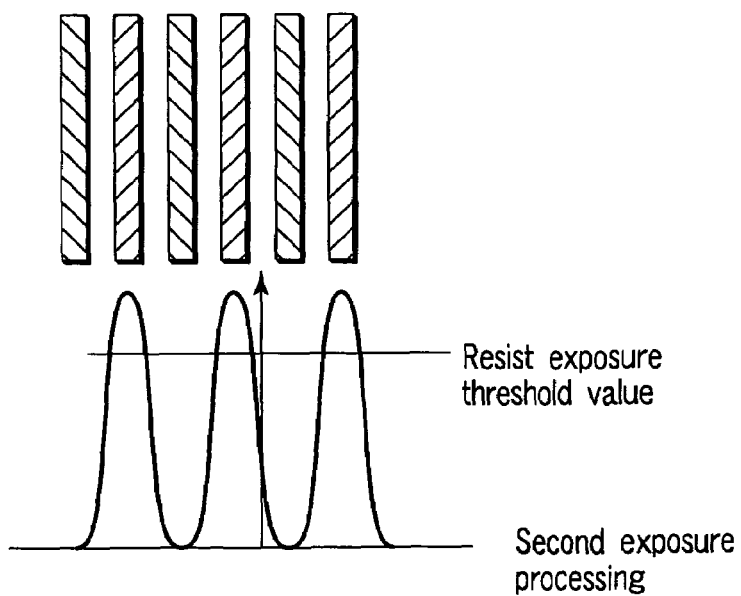
FIG. 39 is a schematic view showing a second exposure processing in the exposure device.
Figure 40:
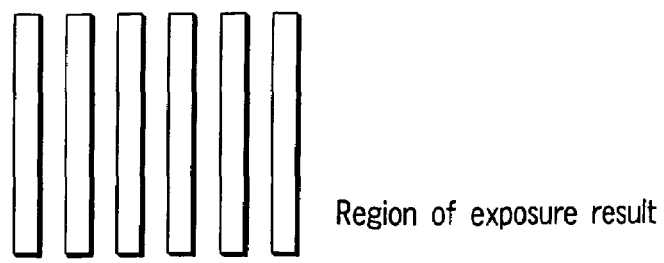
FIG. 40 is a schematic view showing a transfer result in the exposure device.

FIG. 39 shows the linear exposed region and exposure strength by the second shot of laser beam. The glass substrate 111 is subjected to the exposure processing in the exposed region having the exposure strength higher than the resist exposure threshold value. The exposed region of the second shot is formed in each interval between the exposed regions of the first shot.

As a result, a linear pattern is transferred to the resist on the glass substrate 111 by the second exposure processing as shown in FIG. 36.

Additionally, when the plurality of line patterns formed on the mask 114 are used to perform the resist exposure processing, and each interval between the line patterns is narrowed, the line pattern cannot be resolved by the vicinity of a resolution limit by the projection lens system.

Figure 41:
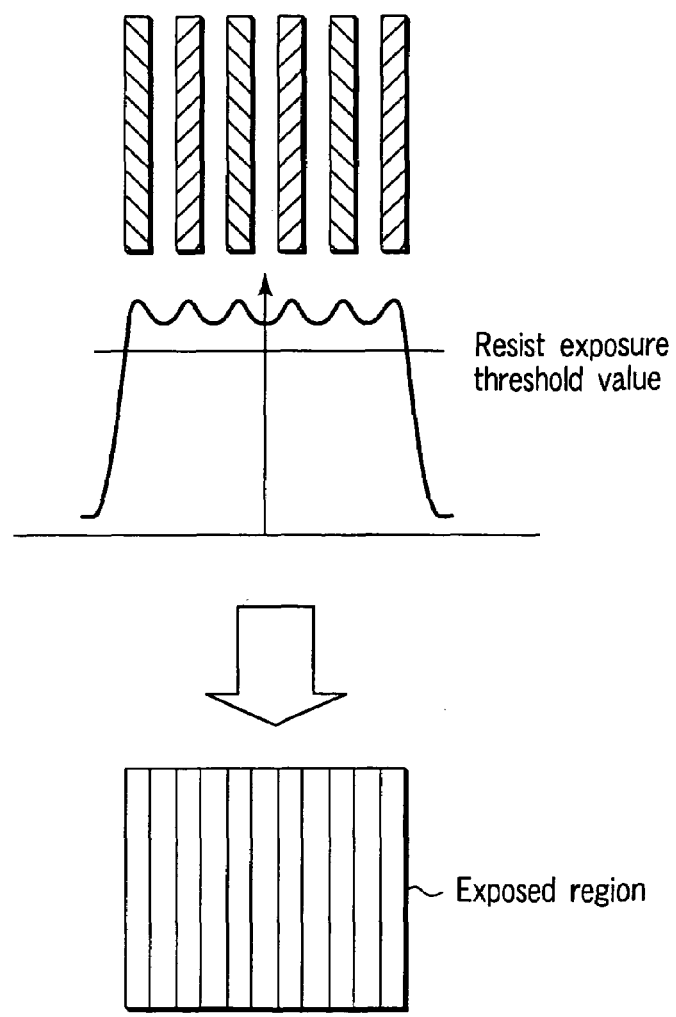
FIG. 41 is a schematic view showing a transfer action by a conventional exposure device.

Therefore, as shown in FIG. 41, the exposure strength continuously becomes higher than the resist exposure threshold value. Thereby, the exposed region of the line pattern does not appear. Therefore, the resist on the glass substrate 111 is exposed by a broad pattern.

Even in this case, according to the eighth embodiment of the present invention, even when the exposed region of the line pattern is narrowed, each exposed region can be resolved and the exposure processing can be performed. The linear pattern, which has not heretofore been achieved, can be transferred onto the glass substrate 111 with precision and at high resolution.

For example, the respective laser irradiated regions do not completely overlap one another, and the mask is formed so that a part of the laser irradiated region has the overlapped portion. This mask may be used to perform the laser processing and exposure. Even in this case, the effect of the present invention can be obtained.

The openings formed in the masks 13, 30, 40, 50, 60, 70, 80 and 114 explained in the first to ninth embodiments may be any holes thorough which the light such as a pulse laser can passes. For example, a phase shift mask may be used as the mask having these openings.

What is claimed is:

1. A laser processing apparatus for irradiating a mask with a plurality of openings formed therein with a pulse laser, and irradiating a plurality of portions of a work to be processed with said pulse laser transmitted through said plurality of openings at the same time, said apparatus comprising:
   a laser device which outputs said pulse laser;
   a moving section which moves said mask and said work with respect to each other; and
   a controller which controls said moving section to move said mask and said work with respect to each other, and controls said laser device to emit said pulse laser a plurality of times,
   wherein said controller controls said moving section to move said mask and said work with respect to each other so that respective laser irradiated regions disposed adjacent to one another are irradiated with said pulse laser transmitted through said openings different from one another among said plurality of openings, and boundaries of said laser irradiated regions disposed adjacent to each other contact at least each other.

2. The laser processing apparatus according to claim 1, wherein said controller controls said laser device to emit said pulse laser at a constant timing a plurality of times, and controls said moving section to move said work at a constant speed.

3. The laser processing apparatus according to claim 1, wherein said controller controls said moving section and said laser device to move said mask and said work with respect to each other so that said boundaries of said laser irradiated regions disposed adjacent to each other overlap each other.

4. The laser processing apparatus according to claim 1, wherein said mask has a width of said opening and a pitch between said openings in a width length and a pitch interval determined by physical properties of said work, when said work is irradiated with said pulse laser,
   said controller controls said moving section to move said mask and said work with respect to each other, and controls said laser device to emit said pulse laser a plurality of times, and
   said work of the laser irradiated region irradiated with said pulse laser in said work is poly-crystallized.

5. The laser processing apparatus according to claim 1, wherein said work is a silicon film formed on a substrate,
   a width of said opening and a pitch between said openings are formed in a width length and a pitch interval such that a heat gradient is generated in said laser irradiated region on said silicon film, and
   said controller controls said moving section and said laser device to irradiate said silicon film with said pulse laser, and said silicon film is poly-crystallized to form a polycrystalline silicon film having a predetermined or larger particle diameter.

6. The laser processing apparatus according to claim 1, wherein said openings are formed in any one shape of: a linear shape; a polygonal shape; a combination of a ring shape and a dotted shape; a plurality of polygonal shapes having different sizes; and a linear shape inclined with respect to a direction in which said mask and said work are movable relative to each other.

7. The laser processing apparatus according to claim 1, wherein said mask is divided into a plurality of regions, and said openings are formed at portions that are shifted when the divided regions are superposed upon another.

8. The laser processing apparatus according to claim 1, wherein a width length of said opening is 5 $\mu$m or less, and a pitch between said plurality of openings is formed in 1 $\mu$m or more.

9. The laser processing apparatus according to claim 1, further comprising a lighting optical system which shapes and uniforms said pulse laser output from said laser device and irradiates said work through said mask.

10. A laser processing apparatus for irradiating a silicon film with a pulse laser, comprising:

a laser device which outputs said pulse laser;

a mask having a plurality of linear openings formed in the same direction, and having a width of the opening and a pitch between said openings formed in a width length and a pitch interval such that a heat gradient is generated in a laser irradiated region at a time of irradiation of said silicon film with said pulse laser;

a moving section which moves said mask and said silicon film relatively to each other at a constant speed; and a controller which controls said moving section to relatively move said mask and said silicon film relatively to each other at a constant speed, and controls said laser device to emit said pulse laser a plurality of times, wherein said controller allows said respective laser irradiated regions disposed adjacent to one another on said silicon film to be formed by irradiation with said pulse laser transmitted through said openings formed in positions different from one another on said mask, and allows said laser device to output said pulse laser at a timing at which boundaries of said laser irradiated regions disposed adjacent to each other contact at least each other; and said silicon film of said laser irradiated region is poly-crystallized to form a polycrystalline silicon film having a predetermined or larger particle diameter, and a plurality of said poly-crystallized laser irradiated regions are continuously formed.

\* \* \* \* \*